(12) United States Patent
Takahashi

(10) Patent No.: US 6,713,776 B2
(45) Date of Patent: Mar. 30, 2004

(54) METHOD FOR STORING AND REPRODUCING RADIATION IMAGE AND RADIATION IMAGE STORAGE DEVICE

(75) Inventor: Kenji Takahashi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/749,623

(22) Filed: Dec. 28, 2000

(65) Prior Publication Data

US 2001/0022349 A1 Sep. 20, 2001

(30) Foreign Application Priority Data

Dec. 28, 1999 (JP) ............................................. 11-372978

(51) Int. Cl.[7] .............................................. G03B 42/02
(52) U.S. Cl. .................................... 250/582; 250/484.4
(58) Field of Search ............................. 250/484.4, 581, 250/582, 583; 378/147

(56) References Cited

U.S. PATENT DOCUMENTS

| | | | |
|---|---|---|---|
| 3,787,238 A | | 1/1974 | Juliano |
| 4,491,736 A | * | 1/1985 | Teraoka ........................ 250/581 |
| 4,521,904 A | * | 6/1985 | Takano ...................... 250/484.4 |
| 4,939,367 A | | 7/1990 | Adachi |
| 4,999,515 A | * | 3/1991 | Nakamura et al. .......... 250/581 |
| 5,036,207 A | | 7/1991 | Nakamura et al. |
| 5,081,355 A | | 1/1992 | Miyagawa et al. |
| 5,684,853 A | | 11/1997 | Fick et al. |

FOREIGN PATENT DOCUMENTS

| | | |
|---|---|---|
| EP | 0 407 890 A2 | 1/1991 |
| EP | 0 412 730 A2 | 2/1991 |
| EP | 0 423 891 A1 | 4/1991 |
| EP | 0 442 543 A2 | 8/1991 |

OTHER PUBLICATIONS

Patent Abstracts of Japan, vol. 015, No. 382 (p–1257), Sep. 26, 1991 & JP 03 152500 A, Jun. 28, 1991.
Patent Abstracts of Japan, vol. 011, No. 303 (p–622), Oct. 3, 1987 & JP 62 093679 A, Apr. 30, 1987.
Patent Abstracts of Japan, vol. 018, No. 031 (p–1677), Jan. 18, 1994 & JP 05 264799 A, Oct. 12, 1993.

* cited by examiner

*Primary Examiner*—Constantine Hannaher
*Assistant Examiner*—Shun Lee
(74) *Attorney, Agent, or Firm*—Sughrue Mion, PLLC

(57) ABSTRACT

A radiation image storage device composed of a fluorescent sheet which contains a phosphor which absorbs a radiation energy and emits a light of ultraviolet or visible region, and a radiation image storage panel having a fluorescent layer and a radiation image storage layer, in which the fluorescent layer contains a phosphor that absorbs a radiation energy and emits a light of ultraviolet or visible region, and the radiation image storage layer contains a phosphor that absorbs the light emitted by the phosphors of the fluorescent layer and the fluorescent sheet to store energy of the absorbed light and releases the stored energy in the form of a light upon irradiation with a light of visible or infrared region is favorably employed for a radiation image storing and reproducing method.

63 Claims, 14 Drawing Sheets

Thickness of Reflecting Layer ($\mu$ m)

A

B

METHOD FOR STORING AND REPRODUCING RADIATION IMAGE AND RADIATION IMAGE STORAGE DEVICE

FIELD OF THE INVENTION

The present invention relates to a method for storing and reproducing a radiation image utilizing a radiation image storage sheet and a radiation image storage device having a radiation image storage layer favorably employable for the radiation image storing and reproducing method.

BACKGROUND OF THE INVENTION

As a method replacing a conventional radiography, a radiation image storing and reproducing method utilizing a stimulable phosphor was proposed, and is practically employed. The radiation image storing and reproducing method employs a radiation image storage panel (i.e., stimulable phosphor sheet) comprising a stimulable phosphor, and comprises the steps of causing the stimulable phosphor of the storage panel to absorb radiation energy having passed through an object or having radiated from an object; sequentially exciting the stimulable phosphor with an electromagnetic wave such as visible light or infrared rays (i.e., stimulating light) to release the radiation energy stored in the phosphor as light emission (i.e., stimulated emission); photoelectrically detecting the emitted light to obtain electric signals; and reproducing the radiation image of the object as a visible image from the electric signals. The p thus treated is subjected to a step for erasing a radiation energy remaining therein, and then stored for the next image storing and reproducing procedure. Thus, the radiation image storage panel can be repeatedly employed.

In the method, a radiation image is obtainable with a sufficient amount of information by apply a radiation to the object at a considerably smaller dose, as compared with a conventional radiography using a combination of a radiographic film and radiographic intensifying screen.

The radiation image storage panel has a basic structure comprising a support and a stimulable phosphor layer provided thereon. But, if the phosphor layer is self-supporting, the support may be omitted. On the free surface (surface not facing the short) of the phosphor layer, a transparent protective film is generally placed to keep the phosphor layer from chemical deterioration or physical damage.

The phosphor layer generally comprises a binder and stimulable phosphor particles dispersed therein, but it may consist of agglomerated phosphor without binder. The phosphor layer containing no binder can be formed by deposition process or firing process. Further, the layer comprising agglomerated phosphor soaked with a polymer is also known. In any types of phosphor layers, the stimulable phosphor releases a stimulated emission when excited with a stimulating light after having been exposed to a radiation such as X-rays. Accordingly, the radiation in the form of an image having passed through an object or radiated from an object is absorbed by the phosphor layer of the storage panel in proportion to the applied radiation dose, and a radiation image of the object is produced in the storage panel in the form of a latent radiation energy-stored image. The latent radiation energy-stored image can be released as stimulated emission by sequentially irradiating the panel with stimulating light. The stimulated emission is then photoelectrically detected to give electric signals, so as to reproduce a visible image from the electric signals.

Even in the radiation image storing and reproducing method described above, it is naturally desired that a radiation image is reproduced with a high sensitivity and with good quality (such as a high sharpness and good graininess). Therefore, it is preferred to employ a stimulable phosphor which can efficiently absorb a radiation energy which is applied to the phosphor and releases a high stimulated emission as quickly as possible when a stimulating light is applied.

Until now, a certain number of stimulable phosphors are proposed and some of the proposed stimulable phosphors have been practically employed. The conventional radiation image storing and reproducing method utilizes a system in which a stimulable phosphor absorbs a radiation energy transmitted from the object and then relieves a stimulated emission when a stimulating light is applied. It is not easy to produce or discover a phosphor which can efficiently absorb a radiation energy which is applied to the phosphor and then releases a desired high stimulated emission as quickly as possible when a stimulating light is applied.

For instance, a rare earth metal activated alkaline earth metal fluorohalide phosphor is well known as a stimulable phosphor which releases a stimulated emission efficiently. However, the fluorohalide phosphor is not satisfactory in the property absorbing a radiation energy when a radiation is applied to the phosphor. Moreover, it does not release the stimulated emission within a desirably short second after it receives the stimulating light. This indicates that the response time of the fluorohalide phosphor is not satisfactorily short.

The problem in the unsatisfactory response time can be solved by the use of a sensor system comprising a multiple number of sensor members such as a line sensor. However, the problem in the unsatisfactory absorption of the radiation energy has not been solved.

Japanese Patent Provisional Publication No. 55-12142 discloses stimulable ZnS phosphors, and Japanese Patent Provisional Publication No. 2-692 discloses an alkali earth metal sulfide phosphors. These stimulable phosphors are still unsatisfactory, as long as the efficiency in absorbing an applied radiation energy is concerned.

Japanese Patent Publication No. 6-31904 describes a radiation image storage panel comprising a stimulable phosphor which absorbs a radiation energy of X-rays and further absorbs a ultraviolet light in the wavelength region of 250 nm to 400 nm and a phosphor which absorbs a radiation having a wavelength of shorter than 250 nm and emits a ultraviolet light in the wavelength region of 250 to 400 nm. Both phosphors are incorporated into one layer or incorporated separately into two phosphor layers. The ultraviolet light-absorbing phosphor serves as an aid to supply the stimulable phosphor with a radiation energy by converting the radiation energy into a ultraviolet light which can be absorbed by the stimulable phosphor.

SUMMARY OF THE INVENTION

The present invention has an object to provide a new radiation image storing and reproducing method showing a high detection quantum efficiency.

Specifically, the invention has an object to provide a radiation image storing and reproducing method which gives a reproduced radiation image of a high quality at a relatively low radiation dose applied to the object such as a human being.

Further, the invention has an object to provide a radiation image storage device which gives a reproduced radiation image of a high quality at a relatively low radiation dose.

As a result of a series of studies on detection quantum efficiency (DQE) in the radiation image storing and reproducing method, the inventor has had an idea to employ two or more kinds of phosphors, one of which efficiently absorbs a radiation such as X-rays applied to the phosphor and releases a spontaneous light emission, and another or other of which efficiently absorbs the light emission and stores the light emission as a radiation energy which can be released in the form of a light why it is exposed to a stimulating light.

The inventor has further studied the above-described idea and attained to the present invention which has a variety of working systems and embodiments.

From one aspect, the present invention resides in a method (I) for storing and reproducing a radiation image which comprises the steps of:

placing a fluorescent sheet on a radiation image storage panel comprising a fluorescent layer and a radiation image storage layer in such manner that the fluorescent sheet is arranged adjacent to the image storage layer of the storage panel, so as to give a composite structure, the fluorescent sheet containing a phosphor which absorbs a radiation energy and emits a light of ultraviolet or visible region, the fluorescent layer of the storage panel containing a phosphor which absorbs a radiation energy and emits a light of ultraviolet or visible region, and the radiation image storage layer of the storage panel containing a phosphor which absorbs the light emitted by the phosphors of the fluorescent layer and the fluorescent sheet to store therein energy of the absorbed light and releases the stored energy in the form of a light upon irradiation with a light of visible or infrared region;

applying onto the composite structure on the side of the fluorescent sheet or the radiation image storage panel a radiation having penetrated through an object, a radiation having been emitted by an object, or a radiation having been scattered or diffracted by an object, so as to store energy of the applied radiation in the form of a latent image on the image storage layer of the storage panel;

separating the radiation image storage panel from the fluorescent sheet;

irradiating the image storage panel on the side of image storage layer with stimulating light in a visible or infrared region to excite the phosphor in the storage layer so that the energy stored in the storage layer in the form of a latent image is released in the form of a light;

collecting the light released from the storage layer by light-collecting means;

converting the collected light into a series of electric signals; and producing an image corresponding to the latent image from the electric signals.

From another aspect, the invention resides in a method (II) for storing and reproducing a radiation image which comprises the steps of:

placing a radiation image storage panel between two fluorescent sheets so as to give a composite structure, each of the fluorescent sheets containing a phosphor which absorbs a radiation energy and emits a light of ultraviolet or visible region, and the radiation image storage panel containing a phosphor which absorbs the light emitted by the phosphors of the fluorescent sheets to store therein energy of the absorbed light and releases the stored energy in the form of a light upon irradiation with a light of visible or infrared region;

applying onto the composite structure on one side a radiation having penetrated through an object, a radiation having been emitted by an object, or a radiation having been scattered or diffracted by an object, so as to store energy of the applied radiation in the form of a latent image on the image storage panel;

separating the radiation image storage panel from the fluorescent sheets;

irradiating the image storage panel with stimulating light in a visible or infrared region to excite the phosphor in the storage panel so that the energy stored in the storage panel in the form of a latent image is released in the form of a light;

collecting the light released from the storage panel by light-collecting means;

converting the collected light into a series of electric signals; and producing an image corresponding to the latent image from the electric signals.

From a further aspect, the invention resides in a method (III) for storing and reproducing a radiation image which comprises the steps of:

placing a radiation image storage panel on a fluorescent sheet so as to give a composite structure, the fluorescent sheet containing a phosphor which absorbs a radiation energy and emits a light of ultraviolet or visible region, and the radiation image storage panel containing a phosphor which absorbs the light emitted by the phosphor of the fluorescent sheet to store therein energy of the absorbed light and releases the stored energy in the form of a light upon irradiation with a light of visible or infrared region;

applying onto the composite structure on one side a radiation having penetrated through an object, a radiation having been emitted by an object, or a radiation having been scattered or diffracted by an object, so as to store energy of the applied radiation in the form of a latent image on the image storage panel;

separating the radiation image storage panel from the fluorescent sheet;

irradiating the image storage panel with stimulating light in a visible or infrared region to excite the phosphor in the storage panel so that the energy stored in the storage panel in the form of a latent image is released in the form of a light;

collecting the light released from the storage panel by light-collecting means;

converting the collected light into a series of electric signals; and producing an image corresponding to the latent image from the electric signals.

From a still further aspect, the invention resides in a method (IV) for storing and reproducing a radiation image which comprises the steps of:

providing a radiation image storage panel comprising a fluorescent layer and a radiation image storage layer, the fluorescent layer containing a phosphor which absorbs a radiation energy and emits a light of ultraviolet or visible region, and the radiation image storage layer containing a phosphor which absorbs the light emitted by the phosphor of the fluorescent layer to store therein energy of the absorbed light and releases the stored energy in the form of a light upon irradiation with a light of visible or infrared region;

applying onto the storage panel a radiation having penetrated through an object, a radiation having been emitted by an object, or a radiation having been scattered or diffracted by an object, so as to store energy of the applied radiation in the form of a latent image on the image storage layer of the storage panel;

irradiating the image storage panel on the side of image storage layer with stimulating light in a visible or infrared region to excite the phosphor in the storage layer so that the energy stored in the storage layer in the form of a latent image is released in the form of a light;

collecting the light released from the storage layer by light-collecting means;

converting the collected light into a series of electric signals; and producing an image corresponding to the latent image from the electric signals.

From a still further aspect, the invention resides in a method (V) for storing and reproducing a radiation image which comprises the steps of:

providing a plurality of cassettes each of which has therein a fluorescent sheet on a front side thereof, fluorescent sheet containing a phosphor which absorbs a radiation energy and emits a light of ultraviolet or visible region and having a thickness differing from each other;

selecting one of the cassettes;

placing a radiation image storage panel in the selected cassette an a back side thereof, the radiation image storage panel containing a phosphor which absorbs the light emitted by the phosphor of the fluorescent layer to store therein energy of the absorbed light and releases the stored energy in the form of a light upon irradiation with a light of visible or infrared region;

applying onto the front side of the cassette a radiation having penetrated through an object, a radiation having been emitted by an object, or a radiation having been scattered or diffracted by an object, so as to store energy of the applied radiation in the form of a latent image on the image storage panel;

taking the image storage panel out of the cassette;

irradiating the image storage panel on the side with stimulating light in a visible or infrared region to excite the phosphor in the image storage panel so that the energy stored in the image storage panel in the form of a latent image is released in the form of a light;

collecting the light released from the image storage panel by light-collecting means;

converting the collected light into a series of electric signals; and producing an image corresponding to the latent image from the electric signals.

From a still further aspect, the invention resides in an apparatus for storing and reproducing a radiation image utilizing a fluorescent sheet containing a phosphor which absorbs a radiation energy and emits a light of ultraviolet or visible region, and a radiation image storage panel containing a phosphor which absorbs the light emitted by the phosphor of the fluorescent layer to store therein energy of the absorbed light and releases the stored energy in the form of a light upon irradiation with a light of visible or infrared region, which comprises:

a housing having on outer surface thereof a plate with which an object is kept in contact;

the radiation image storage panel fixed within the housing in a position facing the plate;

the fluorescent sheet which is provided in the housing in a position facing the fixed image storage panel under such condition that the fluorescent sheet is able to move forward and backward in relation to the image storage sheet; and a light-detecting means which is placed in the vicinity of the image storage panel and which is able to move into a space formed when the fluorescent sheet moves backward.

In the invention, the radiation employable for the radiation image reproduction means X-rays, α-rays, β-rays, γ-rays, ultraviolet rays, neutron-rays, and their analogue rays. The ultraviolet to visible wavelength region means a wavelength range of 200 nm to 600 nm, while the visible to infrared wavelength region means a wavelength range of 500 nm to 1,600 nm.

DETAILED DESCRIPTION OF THE INVENTION

Figure 1:
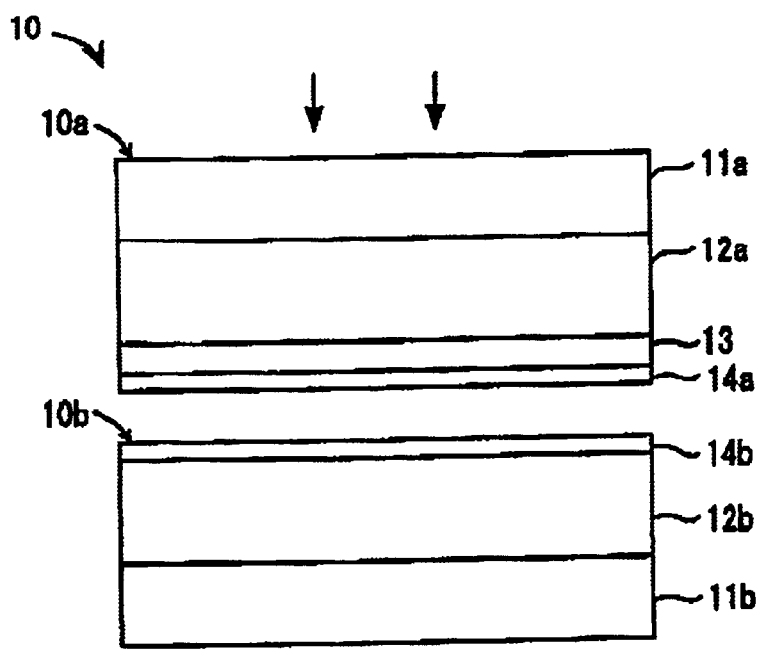
FIG. 1 illustrates a structure of one representative example of a radiation image storage device according to the invention.

Preferred embodiments of the invention are described below:

(1) The method (I) in which each of the fluorescent sheet and the radiation image storage panel is equipped with means containing information on the sheet or the storage panel, and the information is read out after the latent image is stored in the storage layer of the storage panel.

(2) A radiation image storage device comprising a fluorescent sheet which contains a phosphor which absorbs a radiation energy and emits a light of ultraviolet or visible region, and a radiation image storage panel comprising a fluorescent layer and a radiation image storage layer, the fluorescent layer of the storage panel containing a phosphor which absorbs a radiation energy and emits a light of ultraviolet or visible region, and the radiation image storage layer of the storage panel containing a phosphor which absorbs the light emitted by the phosphor of the fluorescent layer and the fluorescent sheet to store therein energy of the absorbed light and releases the stored energy in the form of a light upon irradiation with a light of visible or infrared region.

(3) The device of (2) above in which the radiation image storage layer of the radiation image storage panel has a thickness less than that of the fluorescent layer.

(4) The device of (2) above, in which the radiation image storage layer of the radiation image storage panel has a thickness in the range of 0.2% to 20%, based on the total thickness of the fluorescent sheet and the fluorescent layer of the storage panel.

(5) The device of (2) above, in which at least one layer of the radiation image storage panel is colored with a dye which absorbs at least one of the stimulating rays, a light released from the radiation image storage layer, a light released from the fluorescent layer, and a light released from the fluorescent sheet.

(6) The device of (2) above, in which the fluorescent sheet has on a surface thereof a protective layer and the radiation image storage panel has on a surface thereof a protective layer, the former protective layer showing a row of electrification corresponding to that of the latter protective layer.

(7) The device of (2) above, in which a selective reflecting layer allowing passage of the light released by the phosphor in the fluorescent layer, while reflecting the stimulating light and the light released by the image storage layer is provided in the radiation image storage panel between the fluorescent layer and the radiation image storage layer.

(8) The device of (2) above, in which the phosphors in the fluorescent sheet and the radiation image storage layer and fluorescent layer of the radiation image storage panel are all in the form of particles, the phosphor in the storage layer having a mean diameter equal to or less than that of at least one of the phosphor in the fluorescent sheet and the fluorescent layer.

(9) The device of (2) above, in which the radiation image storage layer shows an absorption coefficient for the light released from the phosphors in the fluorescent layer and the fluorescent sheet as much as twice or more those of the fluorescent layer and fluorescent sheet for the irradiated radiation.

(10) The device of (2) above, in which at least one of the fluorescent sheet and the fluorescent layer comprises acicular phosphor particles arranged vertically or comprises partitions deft the layer on a plane thereof and phosphor-containing areas enclosed with the partitions.

(11) The device of (2) above, in which each of the fluorescent sheet and the radiation image storage panel is equipped with means containing information on the sheet or the storage panel.

(12) The device of (2) above, in which at least one of the phosphors contained in the fluorescent sheet and fluorescent layer has a density of 6.0 g/cm$^3$ or more, or at least one of the fluorescent sheet and fluorescent layer has a density of 4.0 g/cm$^3$ or more.

(13) The device of (2) above, in which the light released from the phosphor contained in the radiation image storage layer shows a secondary stimulating spectrum overlapping with an emission spectrum of at least one of the light released from the phosphors contained in the fluorescent sheet and fluorescent layer at 70% or more.

(14) The device of (2) above, in which each of the phosphor in the fluorescent sheet and the phosphor in the fluorescent layer has an atomic element of the atomic number 37 or larger, provided that the atomic element contained in the phosphor of the fluorescent sheet differs from that contained in the phosphor of the fluorescent layer.

(15) The device of (2) above, in which each of at least one of the fluorescent sheet and the fluorescent layer, and the radiation image storage layer comprises phosphor particles and a binder, provided that each of a ratio of the binder to the phosphor in the fluorescent sheet or the fluorescent layer and a ratio of the binder to the phosphor in the storage layer is 1 or more, and the former ratio is equal to or larger than the latter ratio.

(16) The device of (2) above, in which the radiation image storage panel or the fluorescent sheet has a light-reflecting support or a composite of a support and a diffuse-reflecting layer.

(17) A radiation image storage device comprising a fluorescent sheet which contains a phosphor which absorbs a radiation energy and emits a light of ultraviolet or visible region placed on a radiation image storage panel comprising a fluorescent layer and a radiation image storage layer in such manner that the fluorescent layer is arranged adjacent to the fluorescent layer, the fluorescent layer of the storage panel containing a phosphor which absorbs a radiation energy and emits a light of ultraviolet or visible region, and the radiation image storage layer of the storage panel containing a phosphor which absorbs the light emitted by the phosphors of the fluorescent layer and the fluorescent sheet to store therein energy of the absorbed light and releases the stored energy in the form of a light upon irradiation with a light of visible or infrared region.

(18) The method (II), in which each of the fluorescent sheet and radiation image storage panel is equipped with means containing information on the sheet or the storage panel, and the information is read out after the latent image is stored in the storage panel.

(19) A radiation image storage device comprising a radiation image storage panel and two fluorescent sheets, each of the fluorescent sheets containing a phosphor which absorbs a radiation energy and emits a light of ultraviolet or visible region, and the radiation image storage panel containing a phosphor which absorbs the light emitted by the phosphors of the fluorescent sheets to store therein energy of the absorbed light and releases the stored energy in the form of a light upon irradiation with a light of visible or infrared region.

(20) The device of (19) above, in which the radiation image storage panel has a thickness less than that of each of the fluorescent sheets.

(21) The device of (19) above, in which the radiation image storage panel has a thickness in the range of 0.2% 20%, based on the total thickness of both of the fluorescent sheets.

(22) The device of (19) above, in which at least a portion of the radiation image storage panel is colored with a dye which absorbs at least one of the stimulating rays, a light released from the radiation image storage layer, and a light released from each of the fluorescent sheets.

(23) The device of (19) above in which at least one the fluorescent sheet has on a surface thereof a protective layer and the radiation image storage panel has on a surface thereof a protective layer, the former protective layer showing a row of electrification corresponding to that of the latter protective layer.

(24) The device of (19) above, which the phosphors in the fluorescent sheets and the radiation image storage panel are all in the form of particles, the phosphor in the storage panel having a mean diameter equal to or less than that of at least one of the phosphors in the fluorescent sheets.

(25) The device of (19) above, in which the radiation image storage panel shows an absorption coefficient for the light released from the phosphors in the fluorescent sheets as much as twice or more those of the fluorescent sheets for the irradiated radiation.

(26) The device of (19) above, in which at least one of the fluorescent sheets comprises acicular phosphor particles arranged vertically or comprises partitions defining the layer on a plane thereof and phosphor-containing areas enclosed with the partitions.

(27) The device of (19) above, in which each of the two fluorescent sheets and the radiation image storage panel is equipped with means containing information on the sheet or the storage panel.

(28) The device of (19) above, in which at least one of the phosphors contained in the fluorescent sheets has a density of 6.0 g/cm$^3$ or more, or at least one of the fluorescent sheets has a density of 4.0 g/cm$^3$ or more.

(29) The device of (19) above, in which the light released from the phosphor contained in the radiation image storage panel shows a secondary stimulating spectrum overlapping with an emission spectrum of at least one of the light released from the phosphors contained in the fluorescent sheets at 70% or more.

(30) The device of (19) above, in which each of the phosphors in the fluorescent sheets has an atomic element of the atomic number 37 or larger, provided that the atomic element contained in the phosphor of one fluorescent sheet differs from that contained in the phosphor of another fluorescent sheet.

(31) The device of (19) above, in which each of at least one fluorescent sheet and the radiation image storage panel comprises phosphor particles and a binder, provided that each of a ratio of the binder to the phosphor in at least one fluorescent sheet and a ratio of the binder to the phosphor in the storage panel is 1 or more, and the former ratio is equal to or larger than the latter ratio.

(32) The device of (19) above, in which the radiation image storage panel or one fluorescent sheet has a light-reflecting support or a composite of a support and a diffuse-reflecting layer.

(33) A radiation image storage device comprising two fluorescent sheets and a radiation image storage panel intervening between the fluorescent sheets, each of the fluorescent sheets containing a phosphor which absorbs a radiation energy and emits a light of ultraviolet or visible region, and the radiation image storage panel containing a phosphor which absorbs the light emitted by the phosphors of the fluorescent sheets to store therein energy of the absorbed light and releases the stored energy in the form of a light upon irradiation with a light of visible or infrared region.

(34) The method (III), in which each of the fluorescent sheet and radiation image storage panel is equipped with means containing information on the sheet or the storage panel and the information is read out after the latent image is stored in the storage panel.

(35) A radiation image storage device comprising a radiation image storage panel and a fluorescent sheet, the fluorescent sheer containing a phosphor which absorbs a radiation energy and emits a light of ultraviolet or visible region, and the radiation image storage panel containing a phosphor which absorbs the light emitted by the phosphor of the fluorescent sheet to store therein energy of the absorbed light and releases the stored energy in the form of a light upon irradiation with a light of visible or infrared region.

(36) The device of (35) above, in which the radiation image storage panel has a thickness less than that of the fluorescent sheet.

(37) The device of (35) above, in which the radiation image storage panel has a thickness in the range of 0.2% to 20%, based on that of the fluorescent sheets.

(38) The device of (35) above, in which at least a portion of the radiation image storage panel is colored with a dye which absorbs at least one of the stimulating rays, a light released from the radiation image storage layer, and a light released from the fluorescent sheet.

(39) The device of (35) above, in which the fluorescent sheet has on a surface thereof a protective layer and the radiation image storage panel has a surface thereof a protective layer, the former protective layer showing a row of electrification corresponding to that of the latter protective layer.

(40) The device of (35) above, in which the phosphors in the fluorescent sheet and the radiation image storage panel are all in the form of particles, the phosphor in the storage panel having a mean diameter equal to or less than that of the phosphor in the fluorescent sheet.

(41) The device of (35) above, in which the radiation image storage panel shows an absorption coefficient for the light released from the phosphor in the fluorescent sheet as much as twice or more that of the fluorescent sheet for the irradiated radiation.

(42) The device of (35) above, in which the fluorescent sheets comprises acicular phosphor particles arranged vertically or comprises partitions defining the layer on a plane thereof and phosphor-containing areas enclosed with the partitions.

(43) The device of (35) above, in which each of the fluorescent sheet and the radiation image storage panel is equipped with means containing information on the sheet or the storage panel.

(44) The device of (35) above, in which the phosphor contained in the fluorescent sheet has a density of 6.0 g/cm$^3$ or more, or the fluorescent sheet has a density of 4.0 g/cm$^3$ or more.

(45) The device of (35) above, in which the light released from the phosphor contained in the radiation image storage panel shows a secondary stimulating spectrum overlapping with an emission spectrum of the light released from the phosphor contained in the fluorescent sheet at 70% or more.

(46) The device of (35) above, in which each of the fluorescent sheet and the radiation image storage panel comprises phosphor particles and a binder, provided that each of a ratio of the binder to the phosphor in the fluorescent sheet and a ratio of the binder to the phosphor in the storage panel is 1 or more, and the former ratio is equal to or larger than the latter ratio.

(47) The device of (35) above, in which the radiation image storage panel or the fluorescent sheet has a light-reflecting support or a composite of a support and a diffuse-reflecting layer.

(48) A radiation image storage device comprising a fluorescent sheets placed on a radiation image storage panel, the fluorescent sheet containing a phosphor which absorbs a radiation energy and emits a light of ultraviolet or visible region, and the radiation image storage panel containing a phosphor which absorbs the light emitted by the phosphors of the fluorescent sheet to store therein energy of the absorbed light and releases the stored energy in the form of a light upon irradiation with a light of visible or infrared region.

(49) A radiation image storage device comprising a fluorescent layer and a radiation image storage layer, the fluorescent layer containing a phosphor which absorbs a radiation energy and emits a light of ultraviolet or visible region, and the radiation image storage layer containing a phosphor which absorbs the light emitted by the phosphor of the fluorescent layer to store therein energy of the absorbed light and releases the stored energy in the form of a light upon irradiation with a light of visible or infrared region.

(50) The device of (49) above, in which the radiation image storage layer has a thickness in the range of 0.2% to 20%, based on that of the fluorescent sheet.

(51) The device of (49) above, in which at least a portion of the device is colored with a dye which absorbs at least one of the stimulating rays, a light released from the radiation image storage layer, and a light released from the fluorescent layer.

(52) The device of (49) above, in which a selective reflecting layer allowing passage of the light released by the phosphor in the fluorescent layer, while reflecting the stimulating light and the light released by the image storage layer is provided between the fluorescent layer and the radiation image storage layer.

(53) The device of (49) above, in which the phosphor in the radiation image storage layer and fluorescent layer are all in the form of particles, the phosphor in the storage layer having a mean diameter equal to or less than that of the phosphor in the fluorescent layer.

(54) The device of (49) above, in which the radiation image storage layer shows an absorption coefficient for the light released from the phosphor in the fluorescent layer as much as twice or more that of the fluorescent layer for the irradiated radiation.

(55) The device of (49) above, in which the fluorescent layer comprises acicular phosphor particles arranged vertically or comprises partitions defining the layer on a plane thereof and phosphor-containing areas enclosed with the partitions.

(56) The device of (49) above, in which the phosphor contained in the fluorescent layer has a density of 6.0 g/cm$^3$ or more, or the fluorescent layer has a density of 4.0 g/cm$^3$ or more.

(57) The device of (49) above, in which light released from the phosphor contained in the radiation image storage layer shows a secondary stimulating spectrum overlapping with an emission spectrum of the light released from the phosphor contained in the fluorescent layer at 70% or more.

(58) The device of (49) above, in which each of the fluorescent layer and the radiation image storage layer comprises phosphor particles and a binder, provided that each of a ratio of the binder to the phosphor in the fluorescent layer and a ratio of the binder to the phosphor in the storage layer is 1 or more, and the former ratio is equal to or larger than the latter ratio.

(59) The device of (49) above which has a light-reflecting support or a composite of a support and a diffuse-reflecting layer.

(60) The method (IV), in which the fluorescent sheet or the cassette is equipped with means containing information on the sheet or the cassette, respectively, and radiation image storage panel is equipped with means containing information on the panel, and the information is read out after the latent image is stored in the storage panel.

(61) A cassette comprising a casing and a cover plate and having therein a fluorescent sheet fixed on one side thereof for encasing therein a radiation image storage panel, in which the image storage panel is kept in contact with the fluorescent sheet in the cassette when it is closed, and the image storage panel only is taken out of the cassette when the cassette is open, the fluorescent sheet containing a phosphor which absorbs a radiation energy and emits a light of ultraviolet or visible region, and the radiation image storage panel containing a phosphor which absorbs the light emitted by the phosphor of the fluorescent layer to store therein energy of the absorbed light and releases the stored energy in the form of a light upon irradiation with a light of visible or infrared region.

(62) A cassette comprising a casing and an elastically bendable cover plate and having therein a fluorescent sheet fixed on the casing for encasing therein a radiation image storage panel, in which the image storage panel is kept in contact with the fluorescent sheet in the cassette when it is closed, and the image storage panel only is taken out of the cassette by bending the cover plate, the fluorescent sheet containing a phosphor which absorbs a radiation energy and emits a light of ultraviolet or visible region, and the radiation image storage panel containing a phosphor which absorbs the light emitted by the phosphor of the fluorescent layer to store therein energy of the absorbed light and releases the stored energy in the form of a light upon irradiation with a light of visible or infrared region.

(63) The apparatus of the invention, in which a light-emitting means for irradiating the radiation image storage panel with a light for removing a radiation energy remaining in the image storage panel is provided in the vicinity of an end of the image storage panel in such manner that the light-emitting means emits a light toward a space formed when the fluorescent sheet moves backward.

(64) A process for producing a radiation image storage device comprising a radiation image storage layer and a fluorescent layer overlaid on the storage layer, the fluorescent layer containing a phosphor which absorbs a radiation energy and emits a light of ultraviolet or visible region, and a radiation image storage layer containing a phosphor which absorbs the light emitted by the phosphors of the fluorescent layer to store therein energy of the absorbed light and releases the stored energy in the form of a light upon irradiation with a light of visible or infrared region, which comprises simultaneously casting a solution containing the phosphor of the fluorescent layer and a solution containing the phosphor of the image storage layer so as to prepare a pair of solution layers placed one on another, and drying the solution layers simultaneously.

Structure of Radiation Image Storage Panel

In the invention a fluorescent layer containing a phosphorus which absorbs a radiation energy and emits a light of ultraviolet or visible region and a radiation image storage layer containing a phosphor which absorbs the light emitted by the phosphors of the fluorescent layer to store therein energy of the absorbed light and releases the stored energy in the form of a light upon irradiation with a light of visible or infrared region is employed in combination. The fluorescent layer can be employed in the form of an independent sheet (which may be named a fluorescent screen). The radiation image storage layer can be employed independently or in combination with the fluorescent layer in combination to give a radiation storage panel or device.

The radiation image storage layer may itself absorb the radiation energy applied to the storage layer, in addition to the absorption of the light emitted by the fluorescent layer or sheet.

The representative combinations of the radiation image storage layer or panel (or device) and the fluorescent layer or sheet are described by referring to the attached drawings.

FIG. 1 illustrates a structure of a radiation image storage device favorably employed for the method (I) according to the invention.

The radiation image storage device 10 is composed of a radiation image storage panel 10a on the front side (to be irradiated with radiation) and a fluorescent sheet 10b on the back side. The image storage panel 10a is composed of a support 11a, a fluorescent layer 12a, a radiation image storage layer 13, and a protective layer 14a. The fluorescent sheet 10b is composed of a support 11b, a fluorescent layer 12b, and a protective layer 14b. The fluorescent she 10b may be placed on the front side.

The fluorescent layer 12a has a thickness, generally, of 50 to 200 μm, preferably of 100 to 150 μm. The fluorescent layer 12b has a thickness equal to or larger than the thickness of the fluorescent layer 12a, and has a thickness, generally of 50 to 300 μm, preferably of 100 to 250 μm. If the fluorescent layer has a divided area as described hereinafter, its thickness can be up to about 600 μm (preferably less than 500 μm).

The radiation image storage layer 13 comprises a stimulable phosphor which can store the radiation energy by absorbing a light of ultraviolet or visible region. Therefore, the image storage layer can be made thin to reach generally the range of 1 to 50 μm, preferably 5 to 20 μm. It is preferred that the image storage layer 13 thinner than the fluorescent layer 12a. Preferably, the image storage layer 13 has a thickness of 0.2 to 20%, based on the thickness of the total thickness of the fluorescent layer 12a and fluorescent layer 12b.

The support 11a, 11b has a thickness generally of 50 to 1,000 μm, preferably 120 to 350 μm. The support can be placed on a substrate such as a carbon fiber sheet or an aluminum sheet.

The protective layer 14a, 14b has a thickness generally of approx. 1 μm to 20 μm, preferably of 3 to 15 μm.

Figure 2:
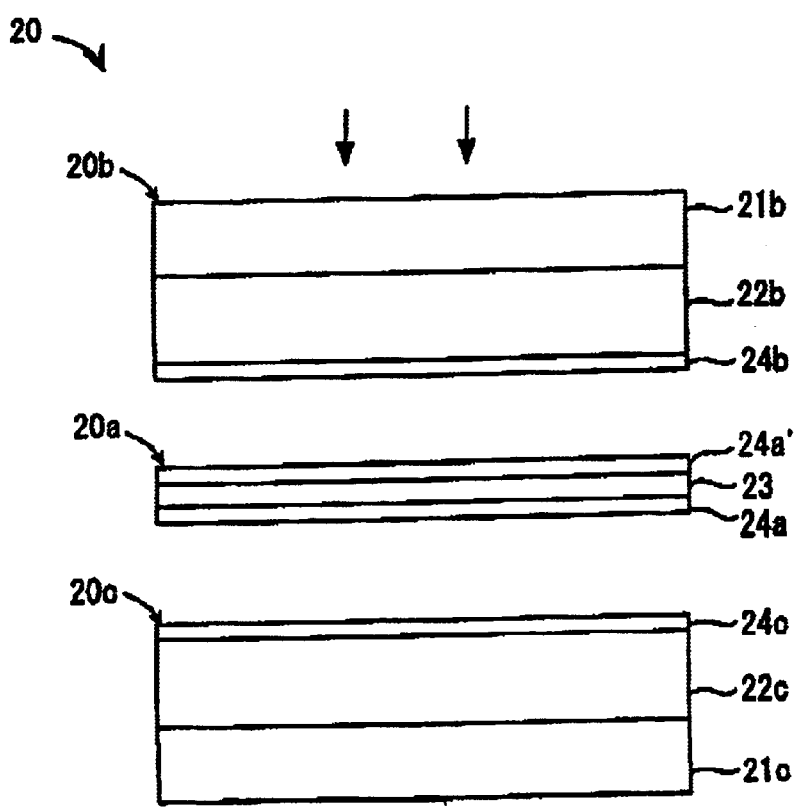
FIG. 2 illustrates a structure of another representative example of a radiation image storage device according to the invention.

FIG. 2 illustrates a structure of a radiation image storage device favorably employed for the method (II) according to the invention.

The radiation image storage device 20 is composed of a radiation image storage panel 20a which is placed between two fluorescent sheets 20b, 20c. The image storage panel 20a is composed of a protective layer 24a, an image storage layer 23, and a protective layer 24a'. The fluorescent sheet 20b is composed of a support 21b, a fluorescent layer 22b, and a protective layer 24b. The fluorescent sheet 20c is composed of a support 21c, a fluorescent layer 22c, and a protective layer 24c.

Figure 3:
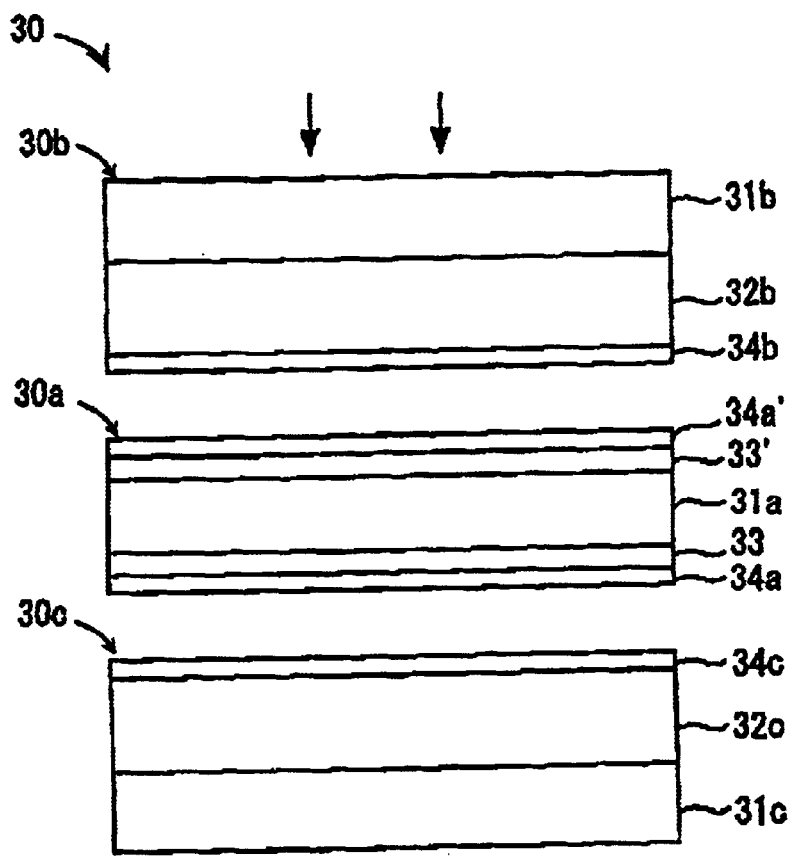
FIG. 3 illustrates a structure of a further representative example of a radiation image storage device according to the invention.

FIG. 3 illustrates a structure of a radiation image storage device favorably employed also for the method (II) according to the invention.

The radiation image storage device 30 is composed of a radiation image storage panel 30a which is placed between two fluorescent sheets 30b, 30c. The image storage panel 30a is composed of a protective layer 34a, an image storage layer 33, a support 31a, an image storage layer 33', and a protective layer 34a'. The fluorescent sheet 30b is composed of a support 31b, a fluorescent layer 32b, and a protective layer 34b. The fluorescent sheet 30c is composed of a support 31c, a fluorescent layer 32c, and a protective layer 34c.

Figure 4:
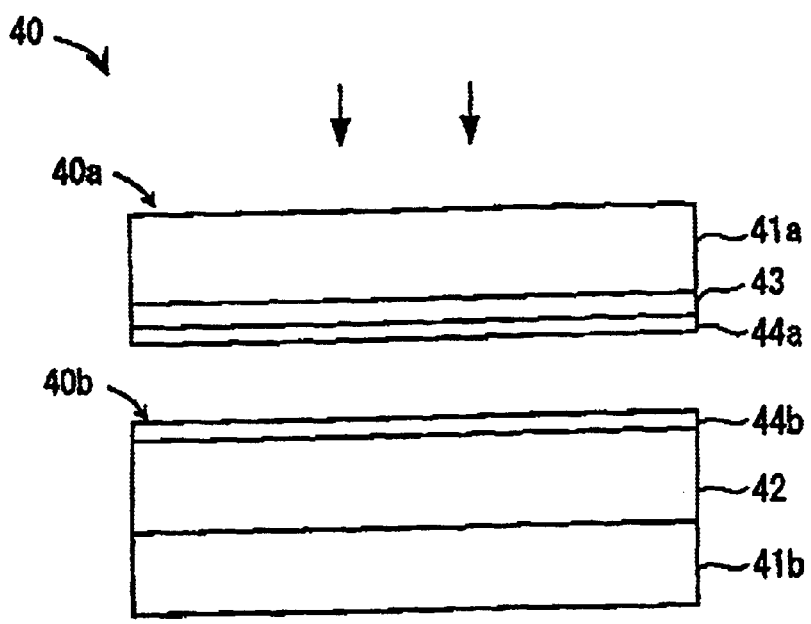
FIG. 4 illustrates a structure of a still further representative example of a radiation image storage device according to the invention.

FIG. 4 illustrates a structure of a radiation image storage device favorably employed for the method (III) according to the invention.

The radiation image storage device 40 is composed of a radiation image storage panel 40a on the front side (to be irradiated with radiation) and a fluorescent sheet 40b on the back side. The image storage panel 40a is composed of a support 41a, a radiation image storage layer 43, and a protective layer 44a. The fluorescent sheet 40b is composed of a support 41b, a fluorescent layer 42, and a protective layer 44b. The fluorescent sheet 40b may be placed on the front side.

Figure 5:
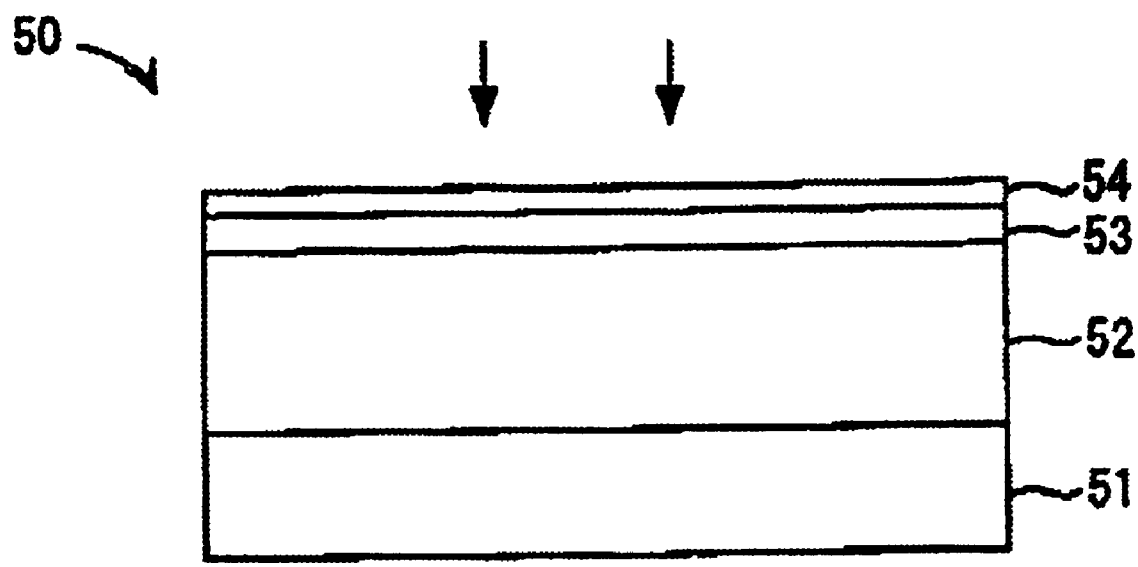
FIG. 5 illustrates a structure of a still further representative example of a radiation image storage device according to the invention.

FIG. 5 illustrates a structure of a radiation image storage device favorably employed for the method (IV) according to the invention.

The radiation image storage device 50 is composed of a radiation image storage panel. The image storage panel 35 is composed of a support 51, a fluorescent layer 52, a radiation image storage layer 53, and a protective layer 54.

The thickness values described for the radiation image storage device of FIG. 1 are also appropriate for the radiation image storage devices of FIG. 2 to FIG. 5.

Stimulable Phosphor

A representative phosphor to be incorporated into the radiation image storage layer is a stimulable phosphor which absorbs a light of the ultraviolet to visible region to store the energy of the absorbed light and, when it is stimulated with a stimulating light of a visible to infrared region, it releases the stored energy in the form of a stimulated emission.

The stimulable phosphor preferably employable in the radiation image storing and reproducing system of the invention absorbs a light of a violet to blue region. Examples of the preferred stimulable phosphors include CaS:Eu,Sm, Cas:Ce,Sm, Cas:Ce,Bi, SrS:Eu,Sm, SrS:Ce,Sm, SrS:Ce,Bi, $(Ca_{0.7}, Sr_{0.3})S:Bi,Cu$, $(Ca,Sr)S:Ce,Bi$, and ZnS:Cu,Pb. Also employable is GdOCl:Ce described in Japanese Patent Publication No. 6-31904 which absorbs a light in the wavelength range of 250 to 400 nm in addition to a radiation of a wavelength of shorter than 250 nm can be employed.

For some of the above-described stimulable phosphors, the peak wavelength of stimulating spectrum and the peak wavelength of an emission spectrum is set forth in Table 1. In Table 1, "Primary stimulating wavelength" essentially corresponds to an absorption wavelength of the stimulable phosphor to store the energy of light emitted by the radiation absorbing phosphor of the fluorescent layer of sheet, and "Secondary stimulating wavelength" means a wavelength of light for stimulating the energy stored-stimulable phosphor to release the energy in the form of a stimulated emission for reproducing the radiation image.

TABLE 1

| No. | Stimulable Phosphor | Stimulating spectrum (Peak wavelength: nm) | | Emission spectrum (Peak wavelength) (nm) |
|---|---|---|---|---|
| | | Primary | Secondary | |
| 1 | CaS:Eu,Sm | 290, 540 | 1150 | 640 |
| 2 | SrS:Eu,Sm | 290, 470 | 1090 | 590 |
| 3 | SrS:Ce,Sm | 280, 440 | 1040 | 490, 530 |
| 4 | ZnS:Cu,Pb | 370 | 750, 1320 | 490 |

Preferred phosphors from the viewpoint of response quickness are the above-described C:Eu,Sm, Cas:Ce,Sm, Cas:Ce,Bi, SrS:Eu,Sm, SrS:Ce,Sm, SrS:Ce,Bi, $(Ca_{0.7}, Sr_{0.3})$S:Bi,Cu, (Ca,Sr)S:Ce,Bi, and ZnS:Cu,Pb. However, the stimulable phosphors employable in the invention are not limited to the phosphors. For instance, a phosphor in which an emission center is produced can be employed.

The stimulable phosphor is generally employed in the form of fine particles, preferably having a mean particle size of approx. 5 μm or less, more preferably 2 μm or less.

Radiation-absorbing Phosphor

The fluorescent layer or the fluorescent sheet comprises a radiation-absorbing phosphor, which absorbs radiations such as X-rays, α-rays, β-rays, γ-rays, ultraviolet rays, neutron-rays, and their analogue rays and releases, generally, a spontaneous emission of a ultraviolet to visible region. The radiation-absorbing phosphor preferably contains an atomic element corresponding to an atomic number 37 or more, preferably an atomic number of 55 to 83, as a mother component.

Examples of the preferred radiation-absorbing phosphors include $LnTaO_4$, (Nb,Gd) type, $Ln_2SiO_5$:Ce type, LnOX:Tm type (Ln is a rare earth element), CsX type (X is halogen), $Gd_2O_2S$:Tb, $Gd_2O_2S$:Pr, Ce, $ZnWO_4$, $LuAlO_3$:Ce, $Gd_3Ga_5O_{12}$:Cr,Ce, and $HfO_2$.

Density, emission wavelength, and a stimulable phosphor preferably employed in combination are set forth in Table 2 for some of the above-described phosphors.

TABLE 2

| Radiation-absorbing phosphor | Density (g/cm³) | Emission wavelength (nm) | Stimulable phosphor (No. of Table 1) |
|---|---|---|---|
| (Y,Sr)TaO₄ | 7.46 | 325 | Nos. 1, 2, 3 |
| (Y,Sr)TaO₄:Nb | 7.46 | 395 | No. 4 |
| (Y,Sr)TaO₄:Gd | 7.46 | 315 | Nos. 1, 2, 3 |
| Gd₂O₂S:Tb | 7.34 | 545 | No. 1 |
| Lu₂SiO₅:Ce | 7.40 | 420 | Nos. 3, 4 |
| Gd₂O₂S:Pr,Ce | 7.34 | 510 | No. 1 |
| ZnWO₄ | 7.87 | 475 | Nos. 1, 2, 3 |

The radiation-absorbing phosphor is generally employed in the form of particles, whose mean particle size preferably is in the range of approx. 1 to 20 μm.

From the viewpoint of match the emission spectrum of the radiation-absorbing phosphor preferably overlaps with the primary stimulating range of the stimulable phosphor at 70% or more. The range of spectrum is calculated from the range between a wavelength in a shorter portion at which the spectrum gives a strength of 10% of the peak value and a wavelength in a longer portion at which the spectrum gives a strength of 10% of the peak value.

It is preferred that a fluorescent layer or sheet placed on the front side and a fluorescent layer or sheet on the back side contain mother components of heavy atomic elements of atomic number 37 or more which are different from each other. Particularly, the fluorescent layer of sheet to be placed on the back side contains an atomic element of greater atomic number.

Production of Radiation Image Storage Device

The phosphor layer can be formed on a support sheet by a known method.

The support film can preferably is a transparent or light-reflecting plastic material sheet or film. Examples of the plastic materials include polyethylene terephthalate, polyethylene naphthalate, polyamide, polyimide, and aramid resin. The thickness of the support sheet generally is in the range of 50 to 1,000 μm.

The light-reflecting support sheet which reflects a primary and/or secondary stimulating light or a stimulated emission may contain a light-reflecting powder such as alumina powder, titanium dioxide powder, or barium sulfate powder. The support sheet may contain carbon black.

The stimulable phosphor layer or radiation-absorbing phosphor layer can be formed, for example, in the following manner which is as such known. First, the phosphor particles and a binder are placed in a solvent, and mixed well to prepare a coating liquid in which the phosphor particles are uniformly dispersed in a binder solution. As the binder, various resin materials are known and optionally usable for the invention. The ratio between the binder and the phosphor in the liquid depends on the characteristics of the phosphor and the aimed property of the phosphor layer, but generally they are employed at a ratio of 1:1 to 1:100 (binder:phosphor, by weight). The coating liquid may further contain various additives such as a dispersing agent (for promoting dispersing of the phosphor particles), a plasticizer (for improving binding between the phosphor particles and the binder), an anti-yellowing agent (for inhibiting yellowing of the phosphor layer), a hardening agent and a crosslinking agent.

The coating liquid thus prepared is evenly coated on a support (e.g., glass plate, metal plate, plastic sheet) by known coating means (such as doctor blade, roll coater, and knife coater), and dried to form a phosphor layer. The phosphor layer is once formed on a temporary sheet and then transferred onto the genuine support.

The phosphor layer can contain acicular phosphor particles which are arranged vertically on the surface of the support. For instance, an acicular phosphor such as CsI:Na, CsI:Tl, or CsBr:Tl can be employed.

The stimulable phosphor layer can be a deposited phosphor layer or a sintered phosphor layer.

The radiation-absorbing phosphor can be placed within areas enclosed partitions so as to define diffusion of a released light within the area. Since the radiation-absorbing phosphor layer is made relatively thick, the provision of the partitions is effective to prevent the released light from diffusing on the plane of the phosphor layer.

The phosphor layer having a set of partitions and divided phosphor areas in which a phosphor is incorporated is already known.

Figure 7:
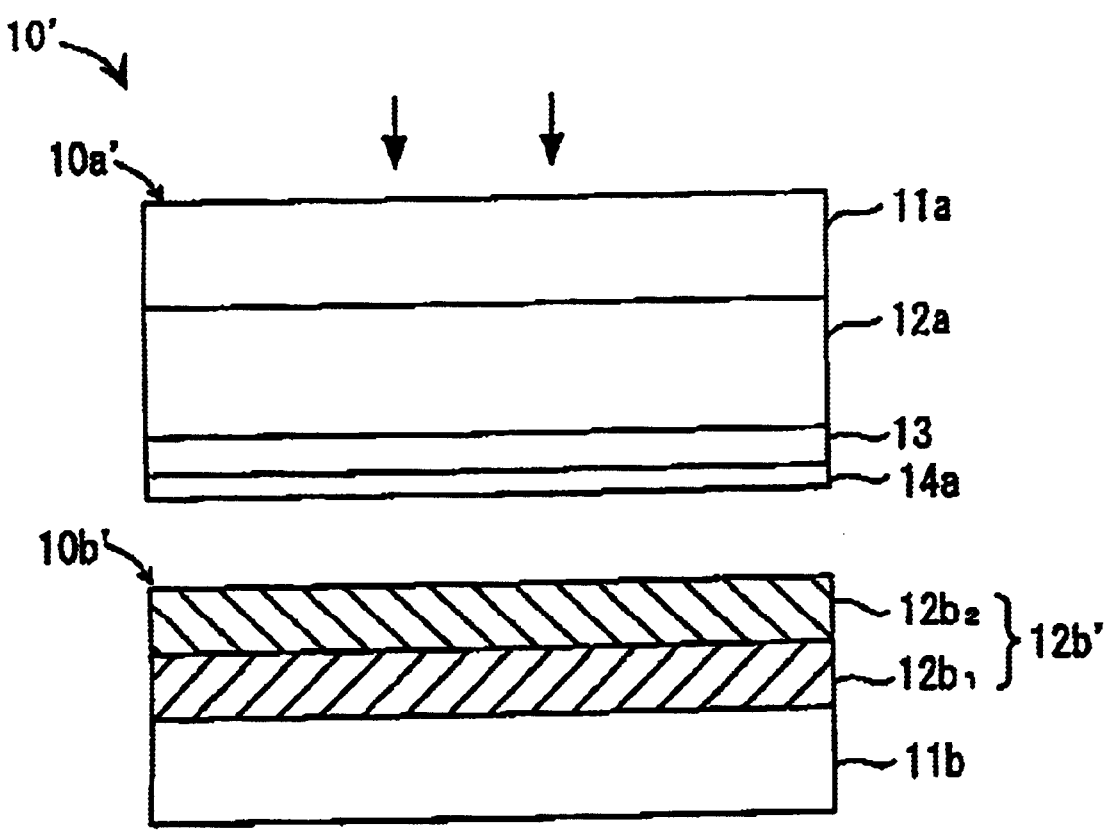
FIG. 7 illustrates a structure of a still further representative example of a radiation image storage device according to the invention.

The radiation-absorbing phosphor layer can be made of a fiber plate and a phosphor layer of acicular phosphor crystals, as shown in FIG. 7.

In FIG. 7, the radiation-absorbing phosphor sheet 10b' containing the radiation-absorbing phosphor layer 12b' is composed of an acicular phosphor layer 12b₁ placed on the layer 11b and a fiber plate 12b₂ placed on the layer 12b₁. The acicular phosphor layer 12b₁ contains cracks which function as partitions. The fiber plate 12b₂ is an optical plate in which several millions of optical fibers are combined in the direction of the depth of the plate. The light of ultraviolet to visible region emitted by the radiation-absorbing phosphor layer passes through the fiber plate $12b_2$ to reach the stimulable phosphor layer 13 almost with no diffusion on the plane direction.

The radiation-absorbing phosphor layer having partitions is preferably arranged in a fluorescent layer or sheet to be arrayed on the back side so as to enhance the sharpness of the resulting radiation image. Moreover, the fluorescent sheet or layer arranged on the back side is generally fixed in a cassette and its transferring is generally required.

In the radiation image storage panel of FIG. 1, a stimulable phosphor layer is placed on the radiation-absorbing phosphor layer. The stimulable phosphor layer is generally made of stimulable phosphor particles and a binder. A stimulable phosphor layer of deposited phosphor or sintered phosphor is also employable.

When each of the radiation-absorbing phosphor layer and a stimulable phosphor layer comprises phosphor particles and a binder. Each of a weight ratio of the binder to phosphor (binder/phosphor: $B_1/P_1$) in the radiation-absorbing phosphor layer and a weight ratio of the binder to phosphor (binder/phosphor: $B_2/P_2$) in the stimulable phosphor layer preferably is 1 or less. Moreover, the former ratio preferably is less than the latter ratio, that is $1 \geq B_2/P_2 \geq B_1/P_1$.

The $B_1/P_1$ in the radiation-absorbing phosphor layer is preferably in the range of 1/8 to 1/50, more preferably 1/15 to 1/40. The $B_2/P_2$ in the stimulable phosphor layer is preferably in the range of 1/1 to 1/40, more preferably 1/2 to 1/20.

It is preferred that a mean particle size of the phosphor in the radiation-absorbing phosphor layer is equal to or layer than that of the stimulable phosphor an the stimulable phosphor layer. More preferably, the mean particle size of the phosphor in the radiation-absorbing phosphor layer is as much as twice or larger, as compared with that of the stimulable phosphor in the stimulable phosphor layer.

The mean particle size of the phosphor in the radiation-absorbing phosphor layer generally is in the range of 1 to 20 $\mu$m, preferably 2 to 10 $\mu$m. The mean particle size of the stimulable phosphor in the stimulable phosphor layer generally is in the range of 0.2 to 20 $\mu$m, preferably 0.5 to 5 $\mu$m. The stimulable phosphor may has a more smaller mean particle size.

Both phosphors can have a particle size distributions such as those described in Japanese Patent Provisional Publications No. 2000-284097, No. 2000-192030, and No. 58-182600.

From the viewpoint of improvement of radiation image quality, the radiation absorption coefficient of the radiation-absorbing layer and the absorption coefficient of absorbing a light (i.e., a primary stimulating light) emitted by the radiation-absorbing layer are preferably according to the following relationship;

Absorption coefficient of absorbing primary stimulating light>Radiation absorption coefficient of the radiation-absorbing layer×2

More preferably is as follows:

Absorption coefficient of absorbing primary stimulating light>Radiation absorption coefficient of the radiation-absorbing layer×5

The absorption coefficient of absorbing primary stimulating light is a virtual coefficient (or apparent coefficient) defined as follows.

It is assumed that the phosphor layer has a uniform thickness (d), a light reflectivity of the phosphor layer when the phosphor layer is placed independently in a space is (r), and a light transmittance is (t). The light reflectivity (r) is determined using a standard white board. A light reflectivities ($R_w$ and $R_b$) of a system surrounding the phosphor layer which is placed adjacent to the white board (light reflectivity $r_w$) and to the black board (light reflectivity $r_b$) under the condition that the white or black board is placed on the side of the back surface of the phosphor layer are calculated by the following equations:

$$R_w = r + r_w \times t^2$$

$$R_b = r + r_b \times t^2$$

The virtual light absorption coefficient K of the phosphor layer can be calculated, assuming that the coefficient K decreases logarithmically along the thickness (d) of the phosphor layer.

$$K = -(1/d) \times ln[t/(1-r)] = -(1/d) \times ln[\{(R_w-R_b)/(r_w-r_b)\}^{1/2}/\{1-R_w+r_w(R_w-R_b)/(r_w-r_b)\}]$$

Figure 8:
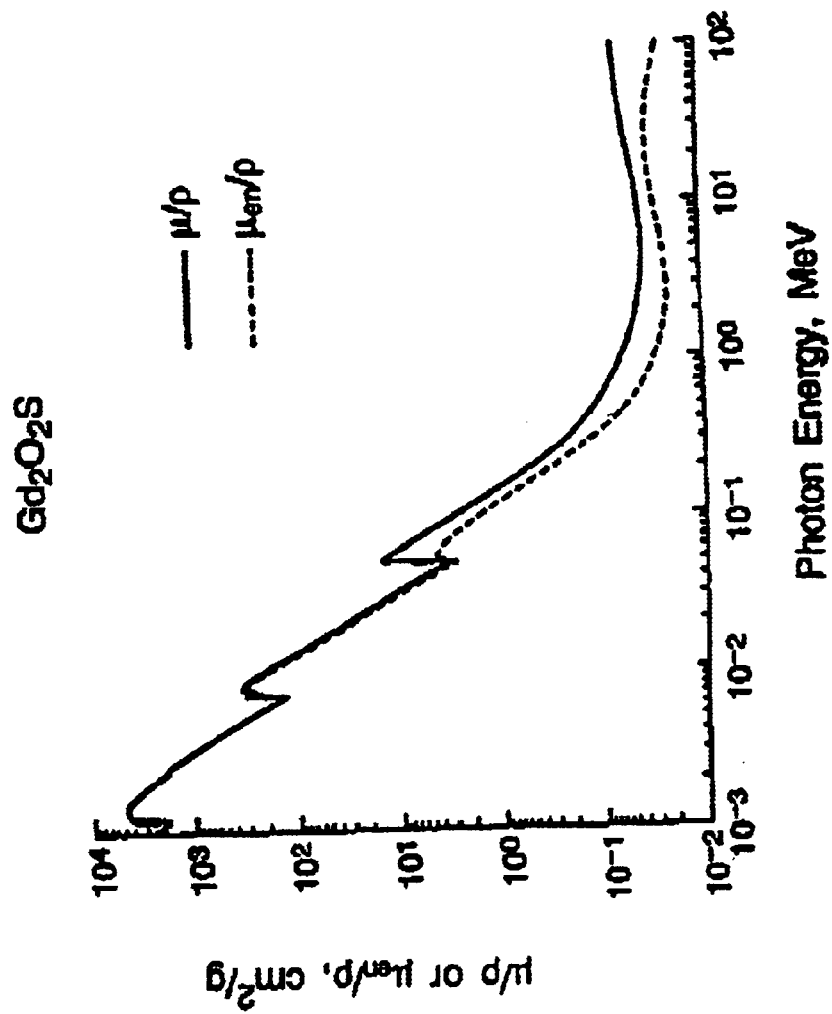
FIG. 8 is a graph showing a mass energy absorption coefficient ($\mu_{en}/\rho$) of $Gd_2O_2S$ in the X-ray region.
Figure 9:
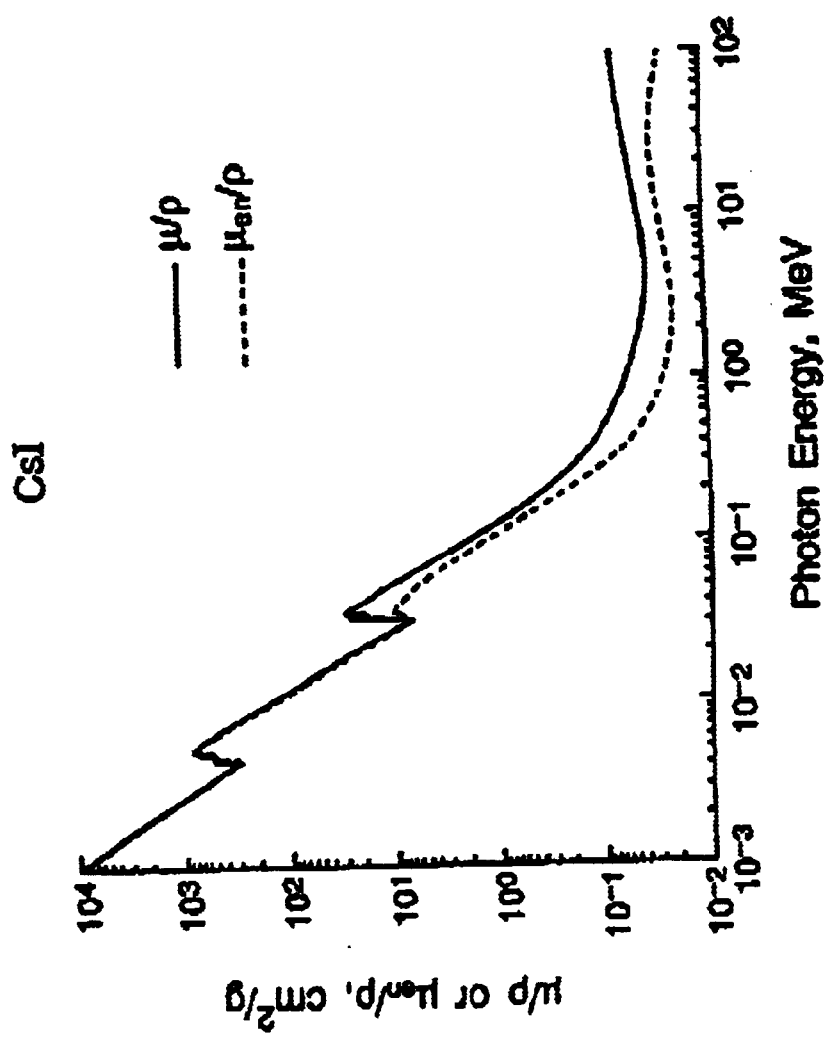
FIG. 9 is a graph sing a mass energy absorption coefficient ($\mu_{en}/\rho$) of CsI in the X-ray region.

The radiation absorption coefficient can be calculated by multiplying a mass energy absorption coefficient $\mu_{en}/\rho$ by a density $\rho$ of the phosphor layer. Each of FIG. 8 and FIG. 9 graphically indicates a relationship between a photon mass decrease coefficient $\mu/\rho$ and a mass energy absorption coefficient $\mu_{en}/\rho$ for each of the phosphors $Gd_2O_2S$ and CsI. The information is available at http://physics.nist.gov/PhysRefdata/XrayMassCoef/cover.html. The density $\rho$ of phosphor layer is determined by multiplying a density of the phosphor per se by a ratio of phosphor in the layer.

Some combinations of the radiation-absorbing phosphor layer and the stimulable phosphor sheet satisfying the condition defined in the invention are set forth below.

1) Radiation-absorbing phosphor layer $Gd_2O_2S$:Tb phosphor (mean diameter: 5 $\mu$m) density: 5 g/cm³ Xray-absorbing coefficient (at 40 KeV) =25 cm⁻¹ Stimulable phosphor layer CaS:Eu,Sm phosphor (mean diameter: 2 $\mu$m) $B_2/P_2$=1/5 light reflection (at 545 nm)=360 cm⁻¹

2) Radiation-absorbing phosphor layer CsI:Tl deposited acicular phosphor layer (mean diameter of acicular phosphor: 5 $\mu$m) density: 4.5 g/cm³ X ray-absorbing coefficient (at 40 KeV) =42 cm⁻¹ Stimulable phosphor layer CaS:Ce, Sm phosphor (mean diameter: 2 $\mu$m) $B_2/P_2$=1/5 light reflection (at 450 nm)=580 cm⁻¹

In order to reproduce a radiation image of high quality, the radiation-absorbing phosphor layer preferably has a mean density of 4.0 g/cm³ or higher, or the radiation-absorbing phosphor per se has a density of 6.0 g/cm³ or higher.

If the mean particle diameter of the stimulable phosphor is not sufficiently small, as compared with the thickness of the stimulable phosphor layer, for instance, under a condition of d/10<a<d [d=thickness of phosphor layer ($\mu$m), a=mean particle diameter of phosphor particles ($\mu$m)], a thin stimulable phosphor layer and a thick radiation-absorbing phosphor layer can be preferably produced at the same time utilizing simultaneous double casting or coating method. By the simultaneous double casting, a thin stimulable phosphor layer such as of a thickness of 5 to 20 $\mu$m can be produced.

The simultaneous double casting (or coating) is well known particularly in the preparation of a silver halide photographic material.

On the fluorescent layer (i.e., radiation-absorbing phosphor layer) or the stimulable phosphor layer, a protective layer is preferably provided. The material and dimensional conditions for protective layers of a fluorescent screen and a radiation image storage panel are well known. The protective layer preferably shows a light-scattering length (at a main emission wavelength of the stimulable phosphor) in the range of 5 to 80 μm, more preferably 10 to 70 μm. Such preferred light-scattering length can be given by incorporating light-scattering particles into the protective layer.

On the protective layer, a fluoro-resin layer can be formed.

Figure 10:
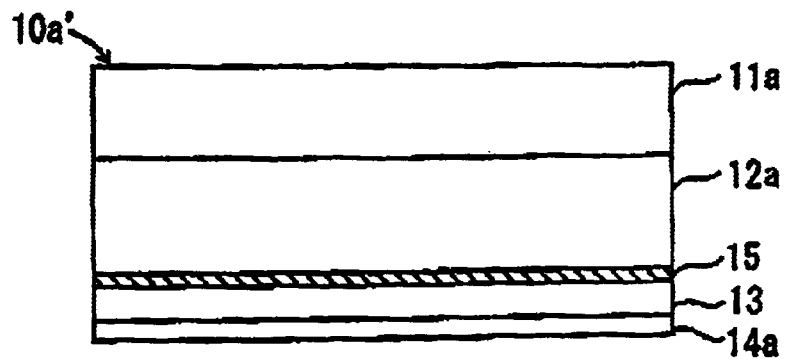
FIG. 10 illustrates a structure of a still further representative example of a radiation image storage device according to the invention.

As illustrated in FIG. 10, a selective reflecting layer can be placed between the fluorescent layer and the stimulable phosphor layer. The provision of the selective reflecting layer allows passage of light emitted by the fluorescent layer and reflects the irradiating light for the reproduction of the radiation image and the stimulated light emitted by the stimulable phosphor, so that the efficiency of collection of the light emitted by the stimulable phosphor layer can be increased and the thickness of the stimulable phosphor layer can be made smaller. Therefore, a radiation image having an improved sharpness can be reproduced.

In FIG. 10, radiation image storage panel 10a' is composed of a support 11a, a fluorescent layer 12a, a selective reflecting layer 15, a stimulable phosphor layer 13, and a protective layer 14a.

The selective reflecting layer can be produced by forming a film of plural layers on a thin film. The film of plural layers (such as a interfering multi-layered film)an be produced by placing two material layers having different refractive indexes alternately, and per se is well known.

Figure 11:
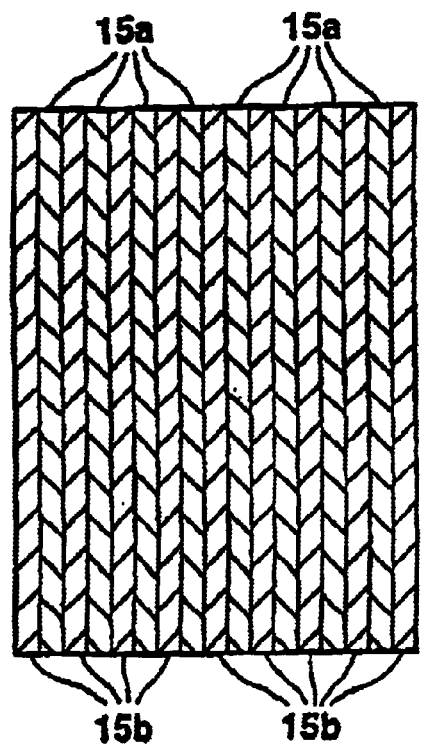
FIG. 11 illustrates a multi-layered filter employable for the radiation image storage device of the invention.

FIG. 11 indicates a typical multi-layered film composed of $SiO_2$ layers (low refractive index layer 15b) and $TiO_2$ layers (high refractive index layer 15a) placed alternatively. The film is composed of 17 layers (total). Details of the layer structure are set forth in Table 3.

TABLE 3

| No. of Layer | Refractive index | Thickness (nm) |
| --- | --- | --- |
| 1 | 1.45 | 80 |
| 2 | 2.35 | 101 |
| 3 | 1.45 | 147 |
| 4 | 2.35 | 80 |
| 5 | 1.45 | 133 |
| 6 | 2.35 | 80 |
| 7 | 1.45 | 133 |
| 8 | 2.35 | 80 |
| 9 | 1.45 | 133 |
| 10 | 2.35 | 80 |
| 11 | 1.45 | 133 |
| 12 | 2.35 | 80 |
| 13 | 1.45 | 133 |
| 14 | 2.35 | 80 |
| 15 | 1.45 | 133 |
| 16 | 2.35 | 80 |
| 17 | 1.45 | 65 |

Figure 12:
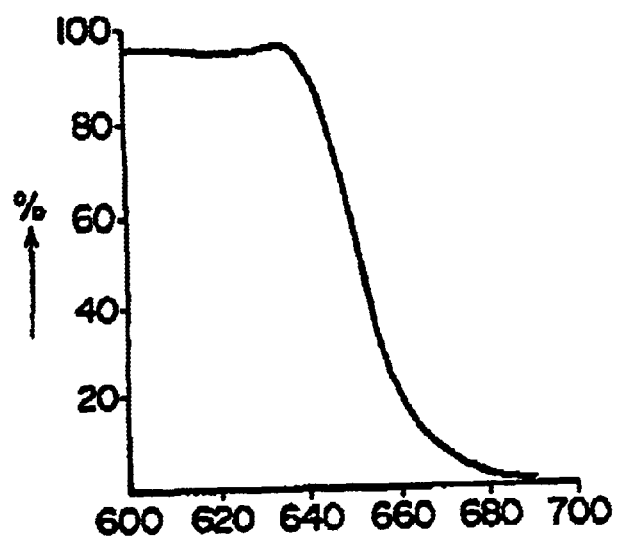
FIG. 12 is a graph indicating the light transmission property of the multi-layered filter.

FIG. 12 is a graph indicating light transmission characteristics of the multi-layered film having the constitution of Table 3. The transmittance (at a light incident angle of 0°) is approximately 97% at a wavelength of 633 nm.

Figure 13:
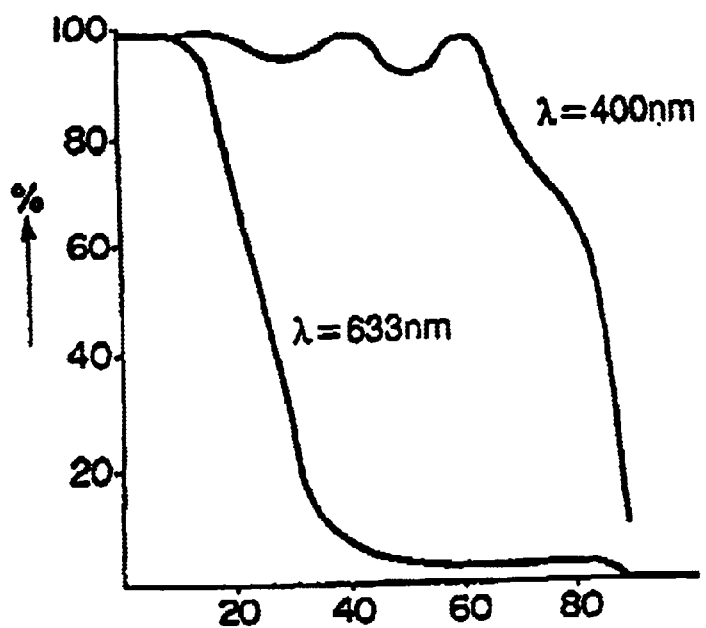
FIG. 13 is a graph indicating a relationship between an incident angle and a transmittance in the specific wavelengths.

The above-mentioned multi-layered film shows a selectivity as to the light incident angle. FIG. 13 is a graph indicating light transmission characteristics the multi-layered film having the constitution at 400 nm and 633 nm. For a light of 633 nm having an incident angle of 0° to 2°, the transmittance is more than 50%, but when the incident angle is larger than 25°, the transmittance lowers to approx. 5%. For a light of 400 nm, the transmittance is more than 90% in any incident angle within 0° to approx. 70°.

The selective reflecting layer can be formed on a thin polymer film (thickness: 4 to 20 μm) by sputtering, depositing or ion-plating the materials of the multi-layered film one on another.

Figure 14:
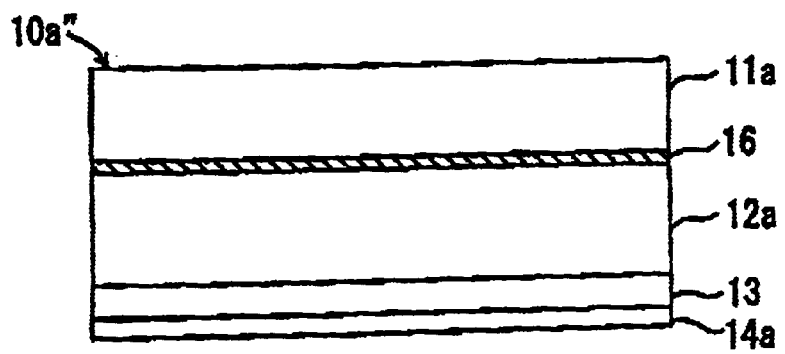
FIG. 14 illustrates a structure of a still further representative example of a radiation image storage device according to the invention.

If the radiation image storage panel is to be placed on the front side, a diffuse-reflecting layer is provided. FIG. 14 indicated a representative structure of such radiation image storage panel 10a" which is composed of a support 11a, a diffuse-reflecting layer 16, a fluorescent layer 12a, a stimulable phosphor layer 13, and a protective layer 14a.

The diffuse-reflecting layer contains a light-scattering material such as titanium dioxide, yttrium oxide, zirconium oxide, or aluminum oxide (alumina) and reflects a light emitted by the fluorescent layer so that an amount of the light (i.e., first stimulating light) to be supplied into the stimulable phosphor layer is increased.

The diffuse-reflecting layer containing titanium oxide is preferably employed in combination of a radiation-absorbing phosphor $Gd_2O_2S$:Tb. If the radiation absorbing phosphor emits a light of shorter wavelength such as approx. 430 nm or shorter, alumina, yttrium oxide or zirconium oxide showing no absorption in that area is preferably employed.

Figure 15:
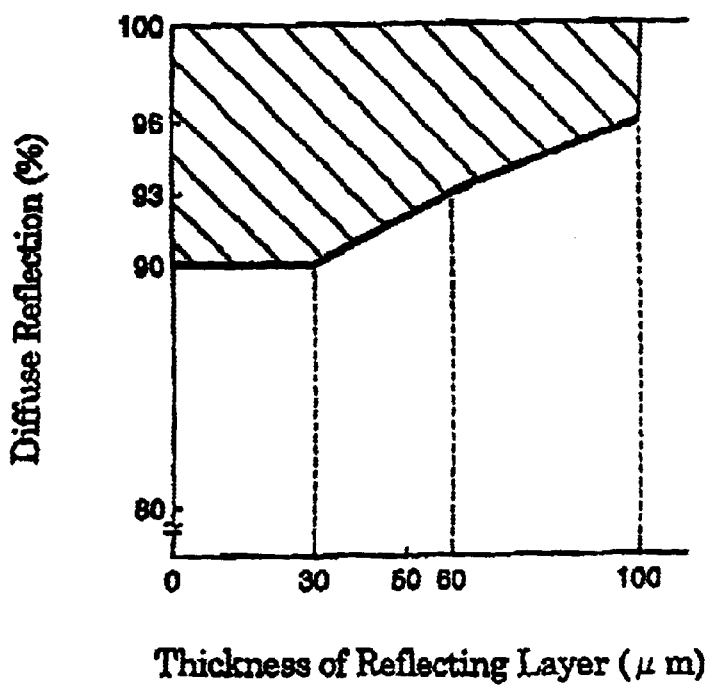
FIG. 15 indicated a preferable area in the relationship of a diffuse reflecting layer between a layer thickness and a diffuse reflectivity.

The diffuse-reflecting layer when it is independently present preferably shows a relationship between the thickness and the diffuse reflectivity corresponding to the shadow area illustrated in FIG. 15.

In place of providing the diffuse-reflecting layer, the support can contain the light-reflecting material so as to serve as the diffuse-reflecting layer.

If desired, an auxiliary layer such as a light-absorbing layer, an adhesive layer, or an electroconductive layer can be provided to the radiation image storage panel.

The radiation image storage panel can be colored by with a dye which absorbs at least one of the stimulating rays, a light released from the radiation image storage layer, a light released from the fluorescent layer, and a light released from the fluorescent sheet. The light released from the radiation image storage layer is preferably absorbed in portion when the light is detected not at a point but a line using a line sensor or the like.

Various dyes which absorb lights of different wavelength are well known.

Fluorescent Sheet

The fluorescent sheet (fluorescent screen or radiation-absorbing phosphor layer) can be manufactured almost in the same manner as in the manufacture of radiation image storage panel. Also, known processes for manufacturing fluorescent sheets such as radiographic intensifying screens can be utilized.

Radiation Image Storing and Reproducing Procedure

Figure 6:
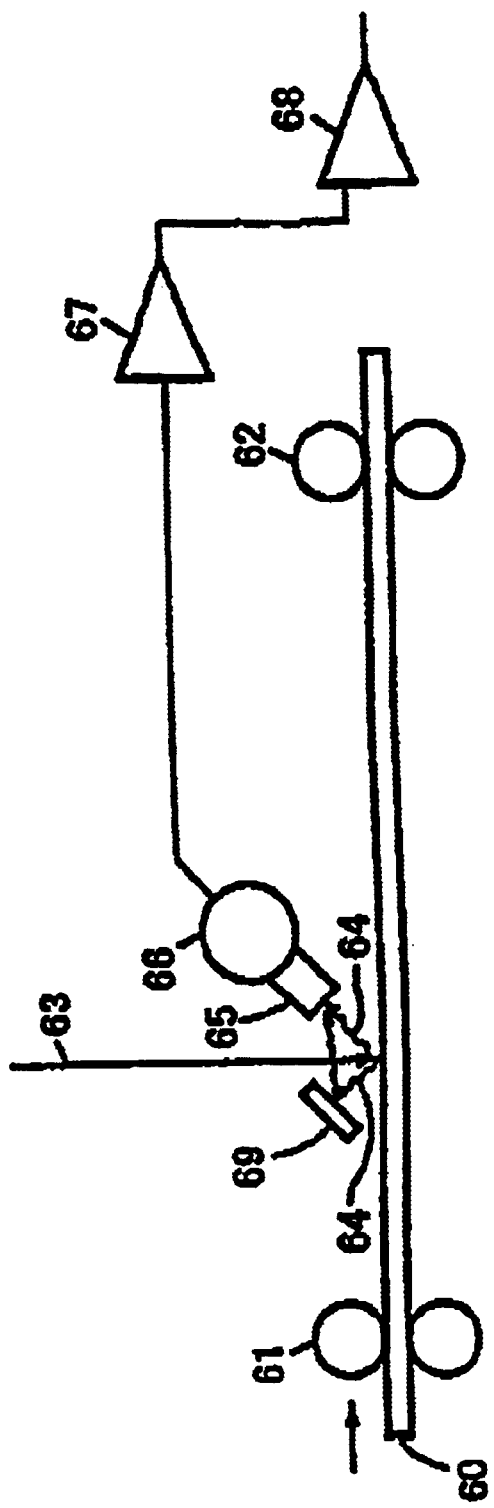
FIG. 6 schematically illustrates one representative radiation image reproducing system.

FIG. 6 schematically illustrates a procedure for reading (or reproducing) a radiation image stored in a radiation image storage panel much as that illustrated in FIG. 1. The procedure of FIG. 6 utilizes a point reading system.

In FIG. 6, a radiation image storage panel 60 is transferred in the direction of arrow, by means of a pair of rollers 61. On the storage panel 60 is applied a stimulating light 63. A stimulated emission 64 is directly detected by a light detecting means 65 or indirectly detected after reflection on a mirror 69. In the photoelectric conversion means 66, the stimulated emission 64 is converted into a series of electric signals, which are then transmitted to a multiplier 67 and further processed in a processor 68.

Use of Plural Fluorescent Sheets

The radiation image storage panel of the invention can be utilized in combination with different fluorescent sheets, in combination of the object of radiography to be desired. For instance, the following combinations are mentioned.

| Thickness of fluorescent layer | Object | Conditions of Radiography |
| --- | --- | --- |
| 0 µm (none) | Mammography | Mo tube, 30–40 kV |
| 60 µm | Limb bones | W tube, 40–60 kV |
| 120 µm | Breast | W tube, 80–140 kV |
| 200 µm | Industrial Product (e.g., pipes) | W tube, 80–140 kV |

Accordingly, a plurality of fluorescent sheets can be set in a radiation image storing and reproducing apparatus.

A radiation image storage device of the invention is generally employed using a cassette for encasing the device. The cassette encasing the radiation image storage device of the invention as such is exposed to radiation, and then the radiation image storage panel is taken out of the cassette for reproducing a radiation image stored in the storage panel.

Figure 16:
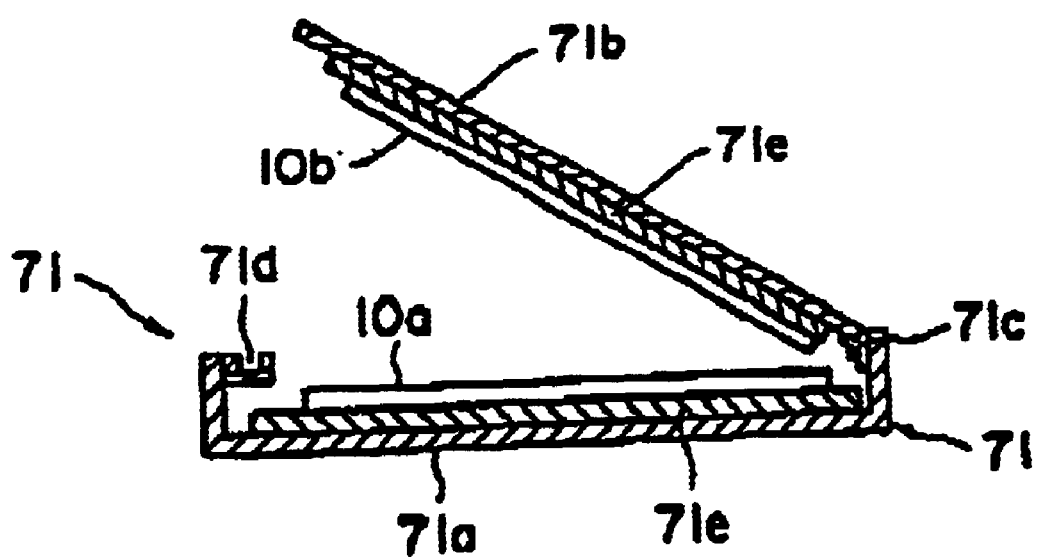
FIG. 16 illustrates an example of a cassette for encasing a radiation image storage device of the invention.

A representative structure of the cassette is illustrated in FIG. 16. The cassette 71 is composed mainly of a case 71a and a covering plate 71b which is connected to the case 71a, for instance, by a hinge 71c. On each of the inner side of the case 71a and the covering plate 71b, an cushion element 71e made of elastic material is fixed, so as to tightly combine a radiation image storage panel 10a and a fluorescent sheet 10b when the cassette 71 is closed. The fluorescent sheet 10b is fixed on the cushion element 71e. After the cassette 71 is exposed to radiation, the cassette is opened by disengaging a lock 71d and the image storage panel 10 is taken out.

Figure 17:
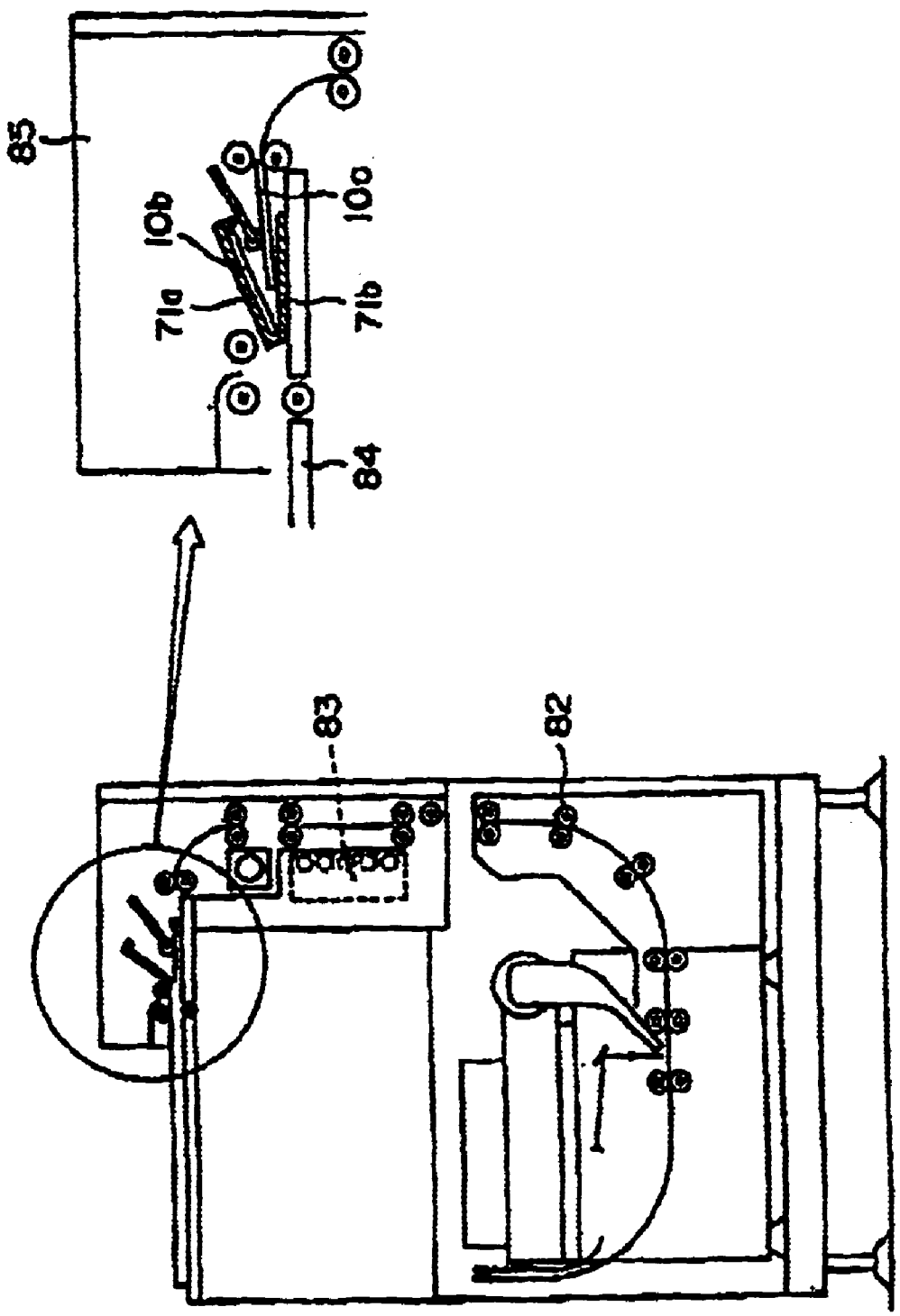
FIG. 17 schematically indicates a radiation image reproducing apparatus employable for the invention.

FIG. 17 illustrates a radiation image reproducing apparatus in which the cassette of FIG. 16 is employed.

The apparatus has a radiation image storage panel reading site, a transfer system 82 and an erasure stem 83, a cassette sly board 84, and a radiation image storage panel-releasing space 85. The cassette transferred on the board 84 is placed upside-down. The cassette supplied to the storage panel-releasing space 85 is then opened by lifting the case 71a and the covering plate 71b is kept on the board 84. A panel picker having on its top a roller is brought into contact with the image storage panel 10a, and takes the storage panel 10a out of the cassette. The storage panel 10 is then placed on the transfer system.

Figure 18:
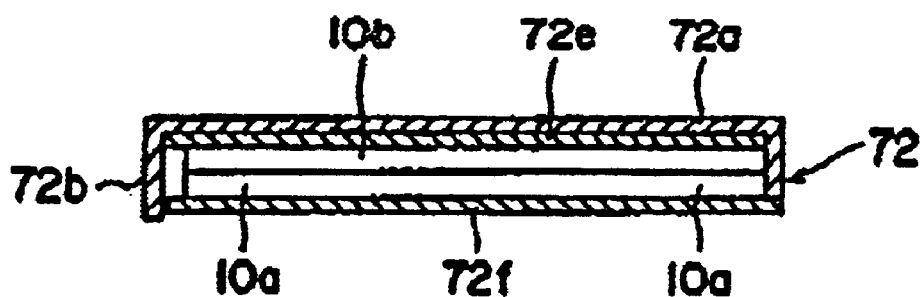
FIG. 18 illustrates another example of a cassette for encasing a radiation image storage device of the invention.
Figure 18:
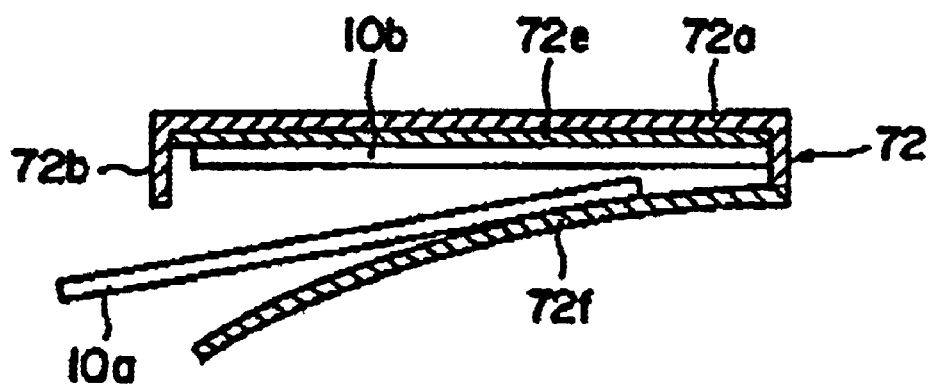

FIG. 18 illustrates another example of a cassette for encasing a radiation image storage device of the invention, in which FIG. 18A illustrates the cassette 72 closed for keeping the radiation image storage device, while FIG. 18B illustrates the cassette 72 opened for taking a radiation image storage panel 10a. The cassette 72 has a case 72a having a side covering member 72b, and a covering plate 72f. Onto the inner surface of the case 72a fixed is a cushion element 72e and a fluorescent sheet 10b. The covering sheet 72f is made of elastic material so that it is freely bendable. When the image storage panel 10a is to be taken out, the covering plate 10a is bent outwardly so that the storage panel 10a can be taken out of the cassette without receiving any deforming force.

An one or more of the radiation image storage panel, the fluorescent sheet, and the cassette can have an information-keeping means on which certain information relative to the panel, sheet or cassette is recorded. The information is favorably employed, for instance, when the image reading conditions are determined, or when the radiation image data should be connected to the panel, sheet or cassette. The information-keeping means can be in the form of a bar code label or a magnetic recording chip and is placed in any position of the panel, sheet and cassette.

Radiation Image Storing and Reproducing Apparatus

Figure 19:
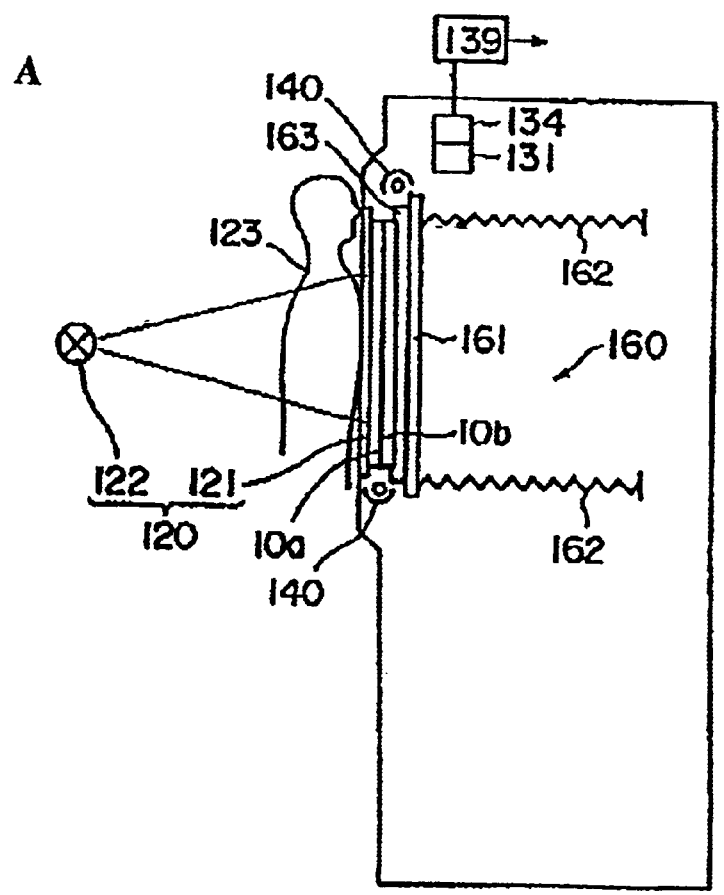
FIG. 19 schematically indicates a radiation image storing and reproducing apparatus favorably employable for the invention.
Figure 19:
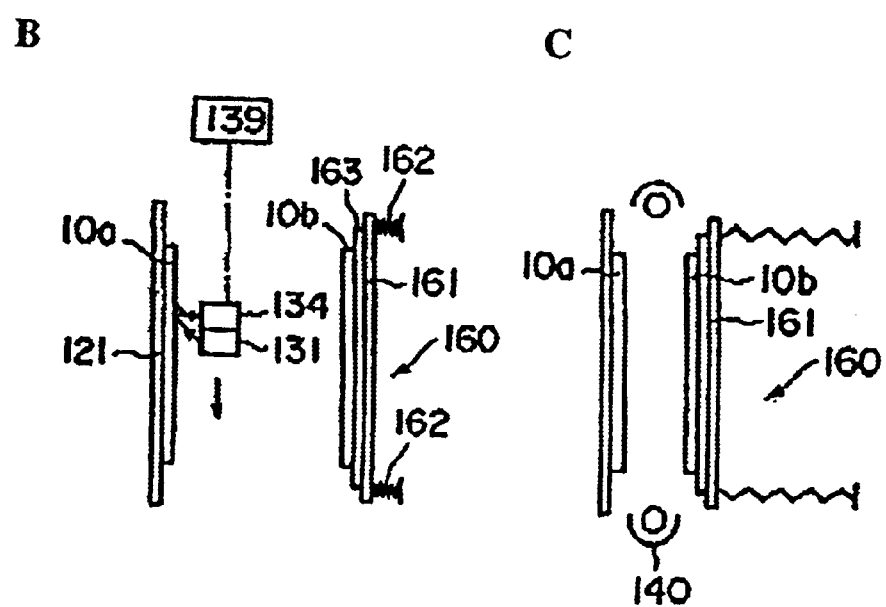

FIG. 19 (A), FIG. 19 (B) and FIG. 19 (C) schematically indicates a radiation image storing and reproducing apparatus favorably employable for the invention.

The apparatus ha sa housing having on its outer surface a plate 121 with which an object such as a patient 123 is kept in contact. To the inner wall of the housing, a radiation image storage panel 10a is fixed in a position facing the plate.

A fluorescent sheet 10b is provided in the housing in a position facing the fixed image storage panel 10a. The fluorescent sheet 10b is able to move forward and backward in relation to the fixed image storage sheet 10a. The movement is made by a fluorescent sheet-moving system 160. The system 160 is composed of a support plate 161 having on its surface a cushion member 163, a pair of extendable/shrinkable arms 162.

Outside of the housing, a radiation applying means 120 composed of a radiation source 122 (e.g., X-ray tube) and the plate 121 for the patient is arranged.

In the housing, a light-detecting means (i.e., image-reproducing means) composed of a light source element 131 (e.g., a linear light source) and a photoelectric detection means 134 (e.g., line sensor) forms a united structure and moves simultaneously. The light-detecting means is connected to a light-detection control means 139, which gives instructions to the combination of a light source element 131 and a photoelectric detection means 134 on the detection procedures and receives a series of electric signal detected by the light-detecting means 134.

Within the housing, an erasing means 140 such as a fluorescent lamp which removes a radiation energy remaining on the radiation image storage panel 10a.

In the apparatus of FIG. 19 (A), after the patient 123 is exposed to X-rays, a pair of arms 162 are shrunken, and hence the support plate 161 is retracted. Simultaneously, the fluorescent sheet 10b is also retracted to produce a space between the fixed image storage panel 10a and the retracted fluorescent sheet 10b. Into thus produced space, a combination of a light source element 131 and a photoelectric detection means 134 enters to sequentially read the radiation image out of the image storage panel 10a. The detected electric signals are transmitted to the control means 139.

When the radiation image-reading procedure is complete, a pair of fluorescent lamps 140 are put on to remove (or erase) the radiation energy remaining on the image storage panel 10a. When the erasing procedure is complete, a pair of arms 162 are extended to push the fluorescent sheet 10b onto the radiation image storage panel 10a.

What is claimed is:

1. A method for storing and reproducing a radiation image which comprises the steps of:

placing a fluorescent sheet on a radiation image storage panel comprising a fluorescent layer and a radiation image storage layer in such manner that the fluorescent sheet is arranged adjacent to the image storage layer of the storage panel, so as to give a composite structure, the fluorescent sheet containing a phosphor which absorbs a radiation energy and emits a light of ultraviolet or visible region, the fluorescent layer of the storage panel containing a phosphor which absorbs a radiation energy and emits a light of ultraviolet or visible region, and the radiation image storage layer of the storage panel containing a phosphor which absorbs the light emitted by the phosphors of the fluorescent layer and the fluorescent sheet to store therein energy of the absorbed light and releases the stored energy in the form of a light upon irradiation with a light of visible or infrared region;

applying onto the composite structure on the side of the fluorescent sheet or the radiation image storage panel a radiation having penetrated through an object, a radiation having been emitted by an object, or a radiation having been scattered or diffracted by an object, so as to store energy of the applied radiation in the form of a latent image on the image storage layer of the storage panel;

separating the radiation image storage panel from the fluorescent sheet;

irradiating the image storage panel on the side of image storage layer with stimulating light in a visible or infrared region to excite the phosphor in the storage layer so that the energy stored in the storage layer in the form of a latent image is released in the form of a light;

collecting the light released from the storage layer by light-collecting means;

converting the collected light into a series of electric signals; and producing an image corresponding to the latent image from the electric signals.

2. The method of claim 1, in which each of the fluorescent sheet and the radiation image storage panel is equipped with means containing information on the sheet or the storage panel, and the information is read out after the latent image is stored in the storage layer of the storage panel.

3. A radiation image storage device comprising a fluorescent sheet which contains a phosphor which absorbs a radiation energy and emits a light of ultraviolet or visible region, and a radiation image storage panel comprising a fluorescent layer and a radiation image storage layer, the fluorescent layer of the storage panel containing a phosphor which absorbs a radiation energy and emits a light of ultraviolet or visible region, and the radiation image storage layer of the storage panel containing a phosphor which absorbs the light emitted by the phosphors of the fluorescent layer and the fluorescent sheet to store therein energy of the absorbed light and releases the stored energy in the form of a light upon irradiation with a light of visible or infrared region.

4. The device of claim 3, in which the radiation image storage layer of the radiation image storage panel has a thickness less than that of the fluorescent layer.

5. The device of claim 3, in which the radiation image storage layer of the radiation image storage panel has a thickness in the range of 0.2% to 20%, based on the total thickness of the fluorescent sheet and the fluorescent layer of the storage panel.

6. The device of claim 3, in which at least one layer of the radiation image storage panel is colored with a dye which absorbs at least one of the stimulating rays, a light released from the radiation image storage layer, a light released from the fluorescent layer, and a light released from the fluorescent sheet.

7. The device of claim 3, in which a selective reflecting layer allowing passage of the light released by the phosphor in the fluorescent layer, while reflecting the stimulating light and the light released by the image storage layer is provided in the radiation image storage panel between the fluorescent layer and the radiation image storage layer.

8. The device of claim 3, in which the phosphors in the fluorescent sheet and the radiation image storage layer and fluorescent layer of the radiation image storage panel are all in the form of particles, the phosphor in the storage layer having a mean diameter equal to or less than that of at least one of the phosphor in the fluorescent sheet and the fluorescent layer.

9. The device of claim 3, in which the radiation image storage layer shows an absorption coefficient for the light released from the phosphors in the fluorescent layer and the fluorescent sheet as much as twice or more those of the fluorescent layer and fluorescent sheet for the irradiated radiation.

10. The device of claim 3, in which at least one of the fluorescent sheet and the fluorescent layer comprises acicular phosphor particles arranged vertically or comprises partitions defining the layer on a plane thereof and phosphor-containing areas enclosed with the partitions.

11. The device of claim 3, in which each of the fluorescent sheet and the radiation image storage panel is equipped with means containing information on the sheet or the storage panel.

12. The device of claim 3, in which at least one of the phosphors contained in the fluorescent sheet and fluorescent layer has a density of 6.0 g/cm$^3$ or more, or at least one of the fluorescent sheet and fluorescent layer has a density of 4.0 g/cm$^3$ or more.

13. The device of claim 3, in which the light released from the phosphor contained in the radiation image storage layer shows a secondary stimulating spectrum overlapping with an emission spectrum of at least one of the light released from the phosphors contained in the fluorescent sheet and fluorescent layer at 70% or more.

14. The device of claim 3, in which each of the phosphor in the fluorescent sheet and the phosphor in the fluorescent layer has an atomic element of the atomic number 37 or larger, provided that the atomic element contained in the phosphor of the fluorescent sheet differs from that contained in the phosphor of the fluorescent layer.

15. The device of claim 3, in which each of at least one of the fluorescent sheet and the fluorescent layer, and the radiation image storage layer comprises phosphor particles and a binder, provided that each of a ratio of the binder to the phosphor in the fluorescent sheet or the fluorescent layer and a ratio of the binder to the phosphor in the storage layer is 1 or more, and the former ratio is equal to or larger than the latter ratio.

16. The device of claim 3, in which the radiation image storage panel or the fluorescent sheet has a light-reflecting support or a composite of a support and a diffuse-reflecting layer.

17. A radiation image storage device comprising a fluorescent sheet which contains a phosphor which absorbs a radiation energy and emits a light of ultraviolet or visible region placed on a radiation image storage panel comprising a fluorescent layer and a radiation image storage layer in such manner that the fluorescent layer is arranged adjacent to the radiation image storage layer, the fluorescent layer of the storage panel containing a phosphor which absorbs a radiation energy and emits a light of ultraviolet or visible region, and the radiation image storage layer of the storage panel containing a phosphor which absorbs the light emitted by the phosphors of the fluorescent layer and the fluorescent sheet to store therein energy of the absorbed light and releases the stored energy in the form of a light upon irradiation with a light of visible or infrared region.

18. A method for storing and reproducing a radiation image which comprises the steps of:

placing a radiation image storage panel between two fluorescent sheets so as to give a composite structure, each of the fluorescent sheets containing a phosphor which absorbs a radiation energy and emits a light of ultraviolet or visible region, and the radiation image storage panel containing a phosphor which absorbs the light emitted by the phosphors of the fluorescent sheets to store therein energy of the absorbed light and releases the stored energy in the form of a light upon irradiation with a light of visible or infrared region;

applying onto the composite structure on one side a radiation having penetrated through an object, a radiation having been emitted by an object, or a radiation having been scattered or diffracted by an object, so as to store energy of the applied radiation in the form of a latent image on the image storage panel;

separating the radiation image storage panel from the fluorescent sheets; irradiating the image storage panel with stimulating light in a visible or infrared region to excite the phosphor in the storage panel so that the energy stored in the storage panel in the form of a latent image is released in the form of a light;

collecting the light released from the storage panel by light-collecting means; converting the collected light into a series of electric signals; and producing an image corresponding to the latent image from the electric signals.

19. The method of claim 18, in which each of the fluorescent sheet and radiation image storage panel is equipped with means containing information on the sheet or the storage panel, and the information is read out after the latent image is stored in the storage panel.

20. A radiation image storage device comprising a radiation image storage panel and two fluorescent sheets, each of the fluorescent sheets containing a phosphor which absorbs a radiation energy and emits a light of ultraviolet or visible region, and the radiation image storage panel containing a phosphor which absorbs the light emitted by the phosphors of the fluorescent sheets to store therein energy of the absorbed light and releases the stored energy in the form of a light upon irradiation with a light of visible or infrared region.

21. The device of claim 20, in which the radiation image storage panel has a thickness less than that of each of the fluorescent sheets.

22. The device of claim 20, in which the radiation image storage panel has a thickness in the range of 0.2% to 20%, based on the total thickness of both of the fluorescent sheets.

23. The device of claim 20, in which at least a portion of the radiation image storage panel is colored with a dye which absorbs at least one of the stimulating rays, a light released from the radiation image storage layer, and a light released from each of the fluorescent sheets.

24. The device of claim 20, in which the phosphors in the fluorescent sheets and the radiation image storage panel are all in the form of particles, the phosphor in the storage panel having a mean diameter equal to or less than that of at least one of the phosphors in the fluorescent sheets.

25. The device of claim 20, in which the radiation image storage panel shows an absorption coefficient for the light released from the phosphors in the fluorescent sheets as much as twice or more those of the fluorescent sheets for the irradiated radiation.

26. The device of claim 20, in which at least one of the fluorescent sheets comprises acicular phosphor particles arranged vertically or comprises partitions defining the layer on a plane thereof and phosphor-containing areas enclosed with the partitions.

27. The device of claim 20, in which each of the two fluorescent sheets and the radiation image storage panel is equipped with means containing information on the sheet or the storage panel.

28. The device of claim 20, in which at least one of the phosphors contained in the fluorescent sheets has a density of 6.0 g/cm$^3$ more, or at least one of the fluorescent sheets has a density of 4.0 g/cm$^3$ or more.

29. The device of claim 20, in which the light released from the phosphor contained in the radiation image storage panel shows a secondary stimulating spectrum overlapping with an emission spectrum of at least one of the light released from the phosphors contained in the fluorescent sheets at 70% or more.

30. The device of claim 20, in which each of the phosphors in the fluorescent sheets has an atomic element of the atomic number 37 or larger, provided that the atomic element contained in the phosphor of one fluorescent sheet differs from that contained in the phosphor of another fluorescent sheet.

31. The device of claim 20, in which each of at least one fluorescent sheet and the radiation image storage panel comprises phosphor particles and a binder, provided that each of a ratio of the binder to the phosphor in at least one fluorescent sheet and a ratio of the binder to the phosphor in the storage panel is 1 or more, and the former ratio is equal to or larger than the latter ratio.

32. The device of claim 20, in which the radiation image storage panel or one fluorescent sheet has a light-reflecting support or a composite of a support and a diffuse-reflecting layer.

33. A radiation image storage device comprising two fluorescent sheets and a radiation image storage panel intervening between the fluorescent sheets, each of the fluorescent sheets containing a phosphor which absorbs a radiation energy and emits a light of ultraviolet or visible region, and the radiation image storage panel containing a phosphor which absorbs the light emitted by the phosphors of the fluorescent sheets to store therein energy of the absorbed light and releases the stored energy in the form of a light upon irradiation with a light of visible or infrared region.

34. A method for storing and reproducing a radiation image which comprises the steps of:

placing a radiation image storage panel on a fluorescent sheet so as to give a composite structure, the fluorescent sheet containing a phosphor which absorbs a radiation energy and emits a light of ultraviolet or visible region, and the radiation image storage panel containing a phosphor which absorbs the light emitted by the phosphor of the fluorescent sheet to store therein energy of the absorbed light and releases the stored energy in the form of a light upon irradiation with a light of visible or infrared region;

applying onto the composite structure on one side a radiation having penetrated through an object, a radiation having been emitted by an object, or a radiation having been scattered or diffracted by an object, so as to store energy of the applied radiation in the form of a latent image on the image storage panel;

separating the radiation image storage panel from the fluorescent sheet;

irradiating the image storage panel with stimulating light in a visible or infrared region to excite the phosphor in the storage panel so that the energy stored in the storage panel in the form of a latent image is released in the form of a light;

collecting the light released from the storage panel by light-collecting means; converting the collected light into a series of electric signals; and producing an image corresponding to the latent image from the electric signals.

35. The method of claim 34, in which each of the fluorescent sheet and radiation image storage panel is equipped with means containing information on the sheet or the storage panel and the information is read out after the latent image is stored in the storage panel.

36. A radiation image storage device comprising a radiation image storage panel and a fluorescent sheet, the fluorescent sheet containing a phosphor which absorbs a radiation energy and emits a light of ultraviolet or visible region, and the radiation image storage panel having a thickness less than a thickness of the fluorescent sheet and containing a phosphor which absorbs the light emitted by the phosphor of the fluorescent sheet to store therein energy of the absorbed light and releases the stored energy in the form of a light upon irradiation with a light of visible or infrared region.

37. The device of claim 36, in which the radiation image storage panel has a thickness in the range of 0.2% to 20%, based on that of the fluorescent sheet.

38. At The device of claim 36, in which at least a portion of the radiation image storage panel is colored with a dye which absorbs at least one of the stimulating rays, a light released from the radiation image storage layer, and a light released from the fluorescent sheet.

39. The device of claim 36, in which the phosphors in the fluorescent sheet and the radiation image storage panel are all in the form of particles, the phosphor in the storage panel having a mean diameter equal to or less than that of the phosphor in the fluorescent sheet.

40. The device of claim 36, in which the radiation image storage panel shows an absorption coefficient for the light released from the phosphor in the fluorescent sheet as much as twice or more that of the fluorescent sheet for the irradiated radiation.

41. The device of claim 36, in which the fluorescent sheets comprises acicular phosphor particles arranged vertically or comprises partitions defining the layer on a plane thereof and phosphor-containing areas enclosed with the partitions.

42. The device of claim 36, in which each of the fluorescent sheet and the radiation image storage panel is equipped with means containing information on the sheet or the storage panel.

43. The device of claim 36, in which the phosphor contained in the fluorescent sheet has a density of 6.0 g/cm$^3$ or more, or the fluorescent sheet has a density of 4.0 g/cm$^3$ or more.

44. The device of claim 36, in which the light released from the phosphor contained in the radiation image storage panel shows a secondary stimulating spectrum overlapping with an emission spectrum of the light released from the phosphor contained in the fluorescent sheet at 70% or more.

45. The device of claim 36, in which each of the fluorescent sheet and the radiation image storage panel comprises phosphor particles and a binder, provided that each of a ratio of the binder to the phosphor in the fluorescent sheet and a ratio of the binder to the phosphor in the storage panel is 1 or more, and the former ratio is equal to or larger than the latter ratio.

46. The device of claim 36, in which the radiation image storage panel or the fluorescent sheet has a light-reflecting support or a composite of a support and a diffuse-reflecting layer.

47. A radiation image storage device comprising a fluorescent layer and a radiation image storage layer, the fluorescent layer containing a phosphor which absorbs a radiation energy and emits a light of ultraviolet or visible region, and the radiation image storage layer having a thickness less than a thickness of the fluorescent layer and containing a phosphor which absorbs the light emitted by the phosphor of the fluorescent layer to store therein energy of the absorbed light and releases the stored energy in the form of a light upon irradiation with a light of visible or infrared region.

48. The device of claim 47, in which the radiation image storage layer has a thickness in the range of 0.2% to 20%, based on that of the fluorescent layer.

49. The device of claim 47, in which at least a portion of the device is colored with a dye which absorbs at least one of the stimulating rays, a light released from the radiation image storage layer, and a light released from the fluorescent layer.

50. The device of claim 47, in which a selective reflecting layer allowing passage of the light released by the phosphor in the fluorescent layer, while reflecting the stimulating light and the light released by the image storage layer is provided between the fluorescent layer and the radiation image storage layer.

51. The device of claim 47, in which the phosphor in the radiation image storage layer and fluorescent layer are all in the form of particles, the phosphor in the storage layer having a mean diameter equal to or less than that of the phosphor in the fluorescent layer.

52. The device of claim 47, which the radiation image storage layer shows an absorption coefficient for the light released from the phosphor in the fluorescent layer as much as twice or more that of the fluorescent layer for the irradiated radiation.

53. The device of claim 47, in which the fluorescent layer comprises acicular phosphor particles arranged vertically or comprises partitions defining the layer on a plane thereof and phosphor-containing areas enclosed with the partitions.

54. The device of claim 47, in which the phosphor contained in the fluorescent layer has a density of 6.0 g/cm$^3$ more, or the fluorescent layer has a density of 4.0 g/cm$^3$ or more.

55. The device of claim 47, in which the light released from the phosphor contained in the radiation image storage layer shows a secondary stimulating spectrum overlapping with an emission spectrum of the light released from the phosphor contained in the fluorescent layer at 70% or more.

56. The device of claim 47, in which each of the fluorescent layer and the radiation image storage layer comprises phosphor particles and a binder, provided that each of a ratio of the binder to the phosphor in the fluorescent layer and a ratio of the binder to the phosphor in the storage layer is 1 or more, and the former ratio is equal to or larger than the latter ratio.

57. The device of claim 47, which has a light-reflecting support or a composite of a support and a diffuse-reflecting layer.

58. A method for storing and reproducing a radiation image which comprises the steps of:
  providing a plurality of cassettes each of which has therein a fluorescent sheet on a front side thereof, fluorescent sheet containing a phosphor which absorbs a radiation energy and emits a light of ultraviolet or visible region and having a thickness differing from each other;
  selecting one of the cassettes;
  placing a radiation image storage panel in the selected cassette on a back side thereof, the radiation image storage panel containing a phosphor which absorbs the light emitted by the phosphor of the fluorescent layer to store therein energy of the absorbed light and releases the stored energy in the form of a light upon irradiation with a light of visible or infrared region;

applying onto the front side of the cassette a radiation having penetrated through an object, a radiation having been emitted by an object, or a radiation having been scattered or diffracted by an object, so as to store energy of the applied radiation in the form of a latent image on the image storage panel;

taking the image storage panel out of the cassette;

irradiating the image storage panel on the side with stimulating light in a visible or infrared region to excite the phosphor in the image storage panel so that the energy stored in the image storage panel in the form of a latent image is released in the form of a light;

collecting the light released from the image storage panel by light-collecting means;

converting the collected light into a series of electric signals; and producing an image corresponding to the latent image from the electric signals.

59. The method of claim 58, in which the fluorescent sheet or the cassette is equipped with means containing information on the sheet or the cassette, respectively, and radiation image storage panel is equipped with means containing information on the panel, and the information is read out after the latent image is stored in the storage panel.

60. A cassette comprising a casing and a cover plate and having therein a fluorescent sheet fixed on one side thereof for encasing therein a radiation image storage panel, in which the image storage panel is kept in contact with the fluorescent sheet in the cassette when it is closed, and the image storage panel only is taken out of the cassette when the cassette is open, the fluorescent sheet containing a phosphor which absorbs a radiation energy and emits a light of ultraviolet or visible region, and the radiation image storage panel containing a phosphor which absorbs the light emitted by the phosphor of the fluorescent layer to store therein energy of the absorbed light and releases the stored energy in the form of a light upon irradiation with a light of visible or infrared region.

61. A cassette comprising a casing and an elastically bendable cover plate and having therein a fluorescent sheet fixed on the casing for encasing therein a radiation image storage panel, in which the image storage panel is kept in contact with the fluorescent sheet in the cassette when it is closed, and the image storage panel only is taken out of the cassette by bending the cover plate, the fluorescent sheet containing a phosphor which absorbs a radiation energy and emits a light of ultraviolet or visible region, and the radiation image storage panel containing a phosphor which absorbs the light emitted by the phosphor of the fluorescent layer to store therein energy of the absorbed light and releases the stored energy in the form of a light upon irradiation with a light of visible or infrared region.

62. An apparatus for storing and reproducing a radiation image utilizing a fluorescent sheet containing a phosphor which absorbs a radiation energy and emits a light of ultraviolet or visible region, and a radiation image storage panel containing a phosphor which absorbs the light emitted by the phosphor of the fluorescent layer to store therein energy of the absorbed light and releases the stored energy in the form of a light upon irradiation with a light of visible or infrared region, which comprises:

a housing having on outer surface thereof a plate with which an object is kept in contact; the radiation image storage panel fixed within the housing in a position facing the plate;

the fluorescent sheet which is provided in the housing in a position facing the fixed image storage panel under such condition that the fluorescent sheet is able to move forward and backward in relation to the image storage sheet; and a light-detecting means which is placed in the vicinity of the image storage panel and which is able to move into a space formed when the fluorescent sheet moves backward.

63. The apparatus of claim 62, in which a light-emitting means for irradiating the radiation image storage panel with a light for removing a radiation energy remaining in the image storage panel is provided in the vicinity of an end of the image storage panel in such manner that the light-emitting means emits a light toward a space formed when the fluorescent sheet moves backward.

* * * * *